(12) United States Patent
Samejima et al.

(10) Patent No.: US 7,078,868 B2
(45) Date of Patent: Jul. 18, 2006

(54) DC—DC CONVERTER AND DEVICE FOR OPERATION OF A HIGH PRESSURE DISCHARGE LAMP USING SAID CONVERTER

(75) Inventors: Takanori Samejima, Himeji (JP); Masashi Okamoto, Akashi (JP); Yoshikazu Suzuki, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/891,024

(22) Filed: Jul. 15, 2004

(65) Prior Publication Data
US 2005/0023994 A1 Feb. 3, 2005

(30) Foreign Application Priority Data
Jul. 30, 2003 (JP) .............................. 2003-203648

(51) Int. Cl.
*H05B 37/02* (2006.01)
(52) U.S. Cl. ....................... 315/219; 315/224; 315/276
(58) Field of Classification Search ................ 315/219, 315/224, 276; 363/21.02
See application file for complete search history.

(56) References Cited

U.S. PATENT DOCUMENTS 5,173,643 A * 12/1992 Sullivan et al. ............. 315/276
5,416,387 A * 5/1995 Cuk et al. ................ 315/209 R
5,666,279 A * 9/1997 Takehara et al. ............... 363/95
5,880,940 A 3/1999 Poon .......................... 315/219
7,012,381 B1 * 3/2006 Samejima et al. ........... 315/219

FOREIGN PATENT DOCUMENTS

JP 1-218352 8/1989

\* cited by examiner

Primary Examiner—Tuyet Vo
Assistant Examiner—Jimmy Vu
(74) Attorney, Agent, or Firm—David S. Safran

(57) ABSTRACT

A low cost DC—DC converter which facilitates a reduction of the switching loss in a wide, variable range of the continuity ratio of the main switching device includes a direct current source; an ON-OFF-controllable main switching device; a main coil which is series connected to the main switching device; a fly-wheel diode which is arranged such that the induction current of the above described main coil flows when the main switching device is shifted into the OFF state; a smoothing capacitor for smoothing the output of the main coil; an auxiliary coil, a resonant capacitor and an ON-OFF-controllable auxiliary switching device. The main switching device and the auxiliary switching device are controlled such that each are alternatively shifted into the ON state such that the main switching device is shifted into the ON state within a given time after the auxiliary switching device has been shifted into the OFF state.

2 Claims, 16 Drawing Sheets

DC—DC CONVERTER AND DEVICE FOR OPERATION OF A HIGH PRESSURE DISCHARGE LAMP USING SAID CONVERTER

BACKGROUND OF THE INVENTION

1. Field of the Invention

The invention relates to a DC—DC converter of the voltage reduction-buck type with the PWM (pulse width modulation) method in which the efficiency is increased, and a device for operating a high pressure discharge lamp such as a metal halide lamp, mercury lamp or the like, using a DC—DC converter.

2. Description of the Related Art

Conventionally, of the converters which convert the voltage of a DC source into another value, output it and supply it to a load, i.e., DC—DC converters, the DC—DC converter of the voltage reduction-buck type, which is shown in FIG. 18 is often used to carry out voltage reduction-conversion.

In this circuit, the current from the DC source (Vin) is repeatedly shifted by a main switching device (Qx') such as a FET or the like into the ON state or the OFF state, and a smoothing capacitor (Cx') is charged via the main coil (Lx'). In this arrangement, this voltage can be applied to a load (Zx).

During the interval in which the above described main switching device (Qx') is in the ON state, charging of the smoothing capacitor (Cx') and current supply to the load (Zx) are carried out directly by the current through the main switching device (Qx'), and moreover, in the main coil (Lx'), energy is stored in the form of a flux. During the interval in which the main switching device (Qx') is in the OFF state, the smoothing capacitor (Cx') is charged via a fly-wheel diode (Dx') by the energy stored in the form of a flux in the main coil (Lx') and current is supplied to the load (Zx).

This converter is operated under PWM control of the main switching device (Qx'). Specifically, by feedback control of the ratio between the time interval in the ON state and the sum of the period of the ON state and the period of the OFF state of the main switching device (Qx'), i.e., the continuity ratio, the voltage supplied to the load (Zx) can be adjusted, even as the voltage of the DC source (Vin) fluctuates, to a desired (for example, constant) value, the supplied current can be adjusted to a desired value and the supplied wattage can be adjusted to the desired value.

Of course, the value of the desired efficiency (voltage, current, wattage or the like) can assume a constant value or it can also be changed over time. For feedback control of the desired efficiency, a detector is needed to determine the output voltage and the output current, as is a feedback control circuit, which is not shown in the drawings.

FIG. 16 shows the voltage and current waveform of this converter using one example. If the main switching device (Qx') is shifted into the ON state, the voltage (VxD') supplied to the main switching device (Qx') passes from the voltage of the DC source (Vin) essentially to 0 V. However, this transition does not take place instantaneously, but requires a certain time.

Here, in the process in which the voltage (VxD') of the main switching device (Qx') gradually decreases, the current (IQx') of the main switching device (Qx') also gradually begins to flow. There is therefore an interval during which neither the voltage (VxD') nor the current (IQx') is 0. According to the size of the time integral of the product of the voltage and the current, for each transition of the main switching device (Qx') into the ON state a switching loss (SwL) occurs on the main switching device (Qx').

This switching loss also arises by the same process in the case of the transition into the ON state as in a transition into the OFF state. However, normally, the loss in the transition into the ON state is greater. The reason is that when the main switching device (Qx') is a FET, for example, a parasitic electrostatic capacitance is present between the source electrode and the drain, that the electrical charge which has been charged onto this electrostatic capacitance during the interval of the OFF state of the main switching device (Qx') at the voltage of the DC source (Vin), in the transition into the ON state is subjected to forced short circuit discharge, and that the energy which is consumed in doing so is added to the switching loss (SwL).

When this switching loss is present, there is not only the disadvantage of a reduction in the efficiency of the converter, but also the disadvantage of a large converter and a cost increase of it, since the heat generation of the main switching device (Qx') is large and since therefore a switching device with large maximum power dissipation must be used and furthermore there must be a large radiator with high radiation efficiency in addition. Furthermore, the fan that supplies cooling air for cooling the radiator must be a high capacity fan, which brings the disadvantages of the reduction in the efficiency and the increase in size and cost of the converter.

In order to eliminate these disadvantages, conventionally, a host of proposals have been made. They are mainly technologies that prevent intervals during which neither the voltage (VxD') nor the current (IQx') is 0. Normally, the technology in which switching is carried out at a 0 voltage of the switching device, is called zero voltage switching, and the technology in which switching is carried out at a 0 current of the switching device, is called zero current switching. Often, using a so-called LC resonance the voltage applied to the switching device and the current flowing in the switching device are temporarily taken over by the voltage induced by the L component (coil) and the current flowing in the C component (capacitor) and are essentially set or reduced to 0, and during this time a transition of the switching device into the ON state or the OFF state is carried out.

For example, in Japanese patent document HEI 1-218352, a DC—DC converter of the voltage reduction-buck type with current resonance is proposed. In this proposal, the current flowing in the main switching device (Qx'), however, due to resonance has a higher peak value than a conventional DC—DC converter of the voltage reduction-buck type. Therefore, it becomes necessary to use a switching device with a high current. Furthermore, in the case in which the switching frequency is higher than the resonant frequency, it is possible that the loss continues to increase because the switching device is shifted into the OFF state at a high current.

Additionally, in this circuit arrangement, according to the assumption of a constant output voltage for a DC—DC converter, the PWM method is undertaken with a constant switching frequency. Because of this, it is necessary to match the continuity ratio thereof to the resonant frequency. The range of the continuity ratio is therefore limited. An increase of the efficiency can therefore only be accomplished in the vicinity of the rated output voltage. Neither a guideline nor conditions for a measure against the fluctuation of the load were considered.

Furthermore, for example, U.S. Pat. No. 5,880,940 discloses a DC—DC converter of the voltage reduction-buck type in which a secondary winding is added to the main coil (Lx'), and thus, a transformer is formed.

In this proposal, a DC—DC converter is described as being operated by connecting an auxiliary switching device to the transformer as a forward converter. However, an increase of the ripple in the output current by this operation was not even considered. The added auxiliary switching device cannot be subjected to zero voltage switching either. It is necessary to add another coil and to carry out zero current switching.

In the case of zero current switching, different from zero voltage switching, there is specifically the disadvantage that the problem of power consumption loss as a result of the forced short circuit discharge is not eliminated in the transition of the electrical charge into an ON state which was charged in the parasitic electrostatic capacitance of the main switching device. Therefore, this is not ideal.

On the other hand, if the use of a DC—DC converter of the voltage reduction-buck type is considered, the resonant conditions of the LC resonance circuit are easily satisfied in a stable manner, since the output voltage is relatively stable for applications such as a constant voltage current source or the like.

In the case of use as a device for operating a high pressure discharge lamp such as a metal halide lamp, a mercury lamp or the like, however, the lamp voltage as the output voltage is changed significantly by the state of the lamp as a load. Under certain circumstances it fluctuates steeply. Therefore, a specially adapted construction is needed. The converter must also be matched to this construction.

The feature of the high pressure discharge lamp as the load of the converter is described below. Generally, a high pressure discharge lamp (Ld) has an arrangement in which a discharge space (Sd) is filled with a discharge medium which contains mercury and in which a pair of opposed electrodes (E1, E2) is located for the main discharge. Between the electrodes (E1, E2), an arc discharge is produced and the radiation emitted from the arc plasmas is used as the light source.

The high pressure discharge lamp (Ld), in contrast to a general load, exhibits a property which is closer to a Zener diode than to an impedance element. This means that the lamp voltage does not change greatly, even if the flowing current changes. A lamp voltage which corresponds to a Zener voltage however changes greatly depending on the discharge state.

Specifically, in the state before the start of the discharge, the Zener voltage is extremely high because no current at all is flowing. If, by operating a starter, such as a high voltage pulse generator or the like, a discharge is started, a glow discharge is formed. In the case, for example, of a discharge lamp which contains greater at least 0.15 mg of mercury per cubic millimeter of volume of the discharge space (Sd), the glow discharge voltage ranges from 180 V to 250 V. In the state before the start of the discharge, a voltage of at least to the glow discharge voltage is applied to the high pressure discharge lamp. Normally, this voltage is roughly 270 V to 350 V and is called the no-load voltage. The starter is operated in this way.

When the electrodes (E1, E2) are heated by the glow discharge to a sufficient degree, a sudden transition into an arc discharge takes place. Immediately after the transition a low arc discharge voltage from 8 V to 15 V is shown. This is a transient arc discharge. The arc discharge vaporizes the mercury and if heating of the mercury vapor continues, the arc discharge voltage gradually increases until it reaches a steady-state arc discharge from 50 V to 150 V. The voltage in a steady-state arc discharge, i.e., the lamp voltage, depends on the density of the mercury which has been added to the discharge space (Sd) and the distance between the electrodes (E1, E2).

Immediately after the transition into the arc discharge, depending on the vapor state of the mercury, the glow discharge suddenly returns or the arc discharge and the glow discharge takes place alternately in a vigorous back and forth manner.

At a constant voltage from the DC source (Vin), the output voltage of the DC—DC converter of the voltage reduction-buck type is at a value which is obtained by multiplying roughly the voltage of the DC source (Vin) by the continuity ratio. Therefore, the DC—DC converter of the voltage reduction-buck type can be kept approximately for the DC-constant voltage current source.

On the other hand, in idealized switching theory in the case in which a DC-constant voltage current source is connected to a Zener diode as a load, i.e., still another DC-constant voltage current source, the theory fails and good analysis is not possible. More accurately, when in the case of connecting a Zener diode as the load to a constant voltage current source, the output voltage of the constant voltage current source is lower than the Zener voltage, no current at all flows in the Zener diode. Conversely, in the case in which the output voltage of the constant voltage current source is higher than the Zener voltage, an infinitely large current flows.

When a discharge lamp which can be roughly regarded as a Zener diode is connected to a realistically present DC—DC converter of the voltage reduction-buck type as a load, extinction of the discharge occurs in the case in which the output voltage of the converter is lower than the Zener voltage. Conversely, in the case in which the output voltage of the converter is higher than the Zener voltage, an unduly high current which is determined by the current serviceability of the DC source (Vin) and of the converter flows in the lamp.

Therefore, in a device for operating a high pressure discharge lamp, the following is required of a converter for supplying a high pressure discharge lamp:

There is a demand for the property which enables a prompt change of the continuity ratio in a wide, variable range for PWM control according to the discharge voltage of the high pressure discharge lamp in order to prevent extinction of the discharge from occurring or an unduly large current from flowing and the lamp and converter circuit from being damaged. These must be achieved even at a discharge voltage that corresponds to the no-load voltage which changes in this way to a great extent and also vigorously depends on the discharge state, i.e., the state in which a no-load voltage is applied (state before the start of discharge), the glow discharge state, the state of a transient arc discharge, or the steady-state arc discharge state. Furthermore, there is a demand for a property that enables maintenance of operation in which the switching loss is reduced by resonant operation.

In the case of high ripple which is contained in the current flowing in the discharge lamp, there is a case in which instability, flicker and extinction of the discharge arise due to acoustic resonance. Therefore, it is required of the converter that the ripple of the output current is small. Accordingly, it is necessary to prevent the operation of the resonant circuit which is arranged for reducing switching loss from accelerating the formation of a superfluous ripple component.

In the case, for example, of a DC—DC converter of the voltage reduction-buck type which is described in the above cited U.S. Pat. No. 5,880,940, the main coil also acts as a transformer with a resonant oscillation effect. Originally, during the interval in which the main switching device is in the ON state, in base operation of the DC—DC converter of the voltage reduction-buck type, on its two ends, the main coil has a voltage difference between the supplied DC source voltage and the output voltage and works in such a way that the input DC source voltage is not applied directly to the load.

In the case of a great fluctuation of the output voltage, of course, the voltage on the primary side of the transformer fluctuates greatly with a resonant oscillation effect. Since the energy transmitted to the secondary circuit of the transformer also fluctuates greatly because of the resonant oscillation effect, as a result the resonant operation also fluctuates greatly. The DC—DC converter of the voltage reduction-buck type described in U.S. Pat. No. 5,880,940 is therefore not suited as a converter for supplying a high pressure discharge lamp.

As was mentioned above, it is necessary in a DC—DC converter of the voltage reduction-buck type to reduce the switching loss in order to avoid raising the size and costs of the converter. However, in the prior art, it was difficult to have a wide, variable range of output voltage and keep down the cost because of the addition of the resonant circuit. In particular, it was difficult to obtain a converter that is suited to operate a high pressure discharge lamp.

SUMMARY OF THE INVENTION

A primary object of the present invention is to devise a DC—DC converter that eliminates the disadvantage of a conventional DC—DC converter, i.e., the disadvantage of difficult implementation of a reduction of the switching loss in a wide, variable range of the continuity ratio of the main switching device with low costs.

Another object of the invention is to devise a device for operating a high pressure discharge lamp that eliminates the disadvantage of a conventional device for operating a high pressure discharge lamp, i.e., the disadvantage of difficult implementation of a reduction of the switching loss with low costs.

According to the first aspect of the invention, for a DC—DC converter of the voltage reduction-buck type which includes the following:
   a direct current source (Vin);
   an ON-OFF-controllable main switching device (Qx);
   a main coil (Lx) which is series connected to the main switching device (Qx);
   a fly-wheel diode (Dx) which is arranged such that the induction current of the above described main coil (Lx) flows when the main switching device (Qx) is shifted into the OFF state; and
   a smoothing capacitor (Cx) for smoothing the output of the main coil (Lx), the objects are achieved in that there are an auxiliary coil (Lw), a resonant capacitor (Cw) and an ON-OFF-controllable auxiliary switching device (Qw), that the auxiliary switching device (Qw) and the resonant capacitor (Cw) are series-connected and thus form a series connection, that this series connection, the auxiliary coil (Lw) and the DC source (Vin) are connected in series and thus form a closed loop, that the series connection, the main switching device (Qx) and the fly-wheel diode (Dx) are series connected and thus form a closed loop, and that the main switching device (Qx) and the auxiliary switching device (Qw) are controlled such that they are shifted in alternation into the ON state, and moreover, the main switching device (Qx), after the auxiliary switching device (Qw) has been shifted into the OFF state, is shifted into the ON state within a given time.

According to the second aspect of the invention, in a device for operating a high pressure discharge lamp (Ld) in which the discharge space (Sd) is filled with a discharge medium and there is a pair of opposite electrodes (E1, E2) for the main discharge, the objects are achieved in that the above described DC—DC converter is used for supplying the high pressure discharge lamp (Ld).

ADVANTAGES

First of all, the action of the invention is described according to its first aspect.

In this invention, by the arrangement of the described DC—DC converter for achieving the objects, the auxiliary switching device (Qw) is shifted into the OFF state before the main switching device (Qx) is shifted into the ON state. Furthermore, in the auxiliary coil (Lw), a voltage is induced in the direction in which the main switching device (Qx) is biased in the backward direction, and the electrical charge of the parasitic electrostatic capacitance of the main switching device (Qx) is discharged via a fly-wheel diode (Dx). In this way, the invention acts such that zero voltage switching is obtained when the main switching device (Qx) is shifted into the ON state. Details are given below.

Furthermore, as is described below, because control is exercised such that the auxiliary switching device (Qw) is shifted into the ON state within a given time τxx after the main switching device (Qx) has been shifted into the OFF state, the following can be achieved.

Before the auxiliary switching device (Qw) is shifted into the ON state, the main switching device (Qx) is shifted into the OFF state, in the auxiliary coil (Lw), the voltage is induced in the direction in which the auxiliary switching device (Qw) is biased in the backward direction, and the electrical charge of the parasitic electrostatic capacitance of the auxiliary switching device (Qw) is discharged. In this way, zero voltage switching can be obtained when the auxiliary switching device (Qw) is shifted into the ON state.

DETAILED DESCRIPTION OF THE INVENTION

Figure 1:
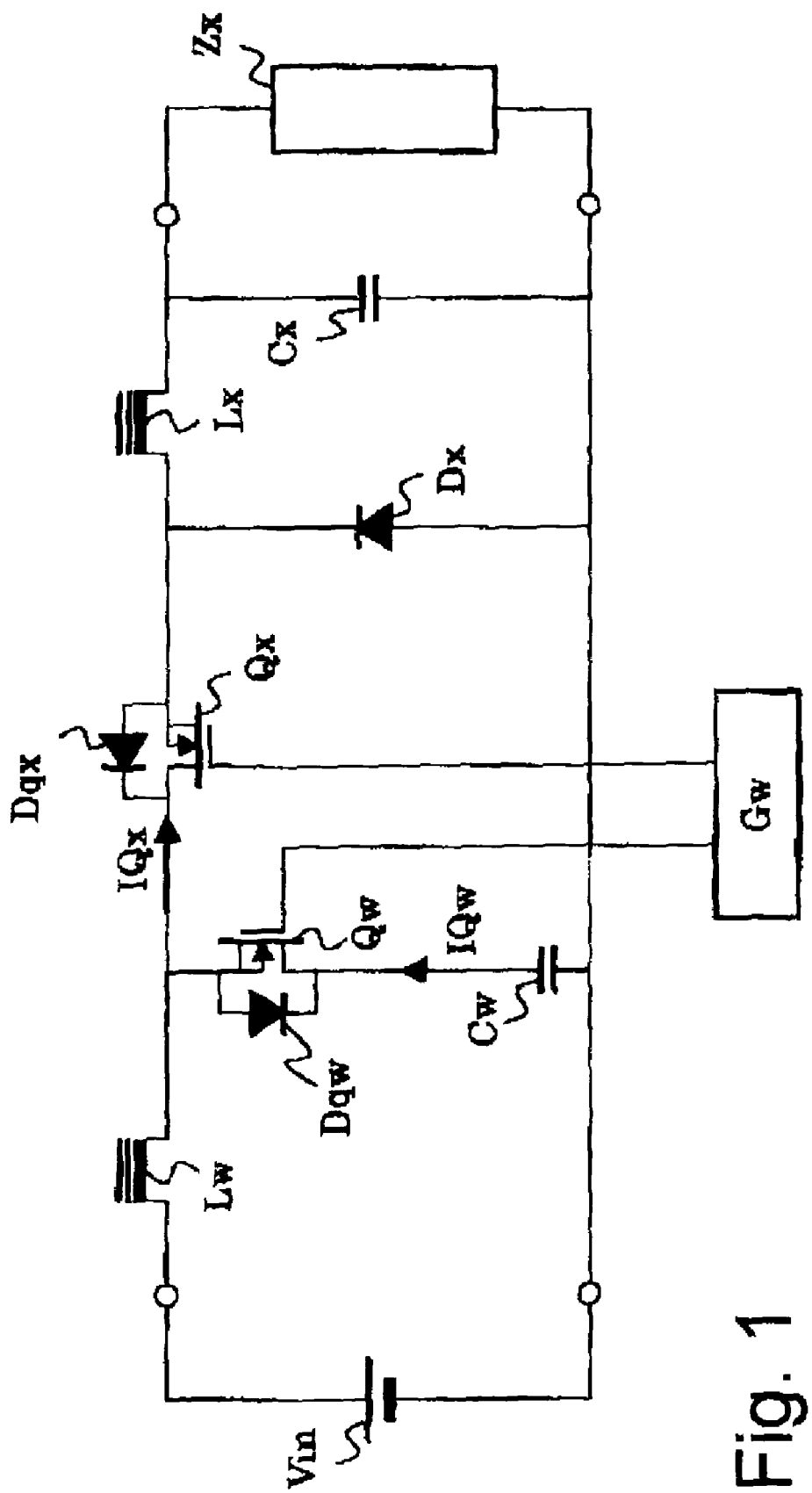
FIG. 1 shows a schematic of the circuit arrangement of a DC—DC converter according to the first aspect of the invention.
Figure 2:
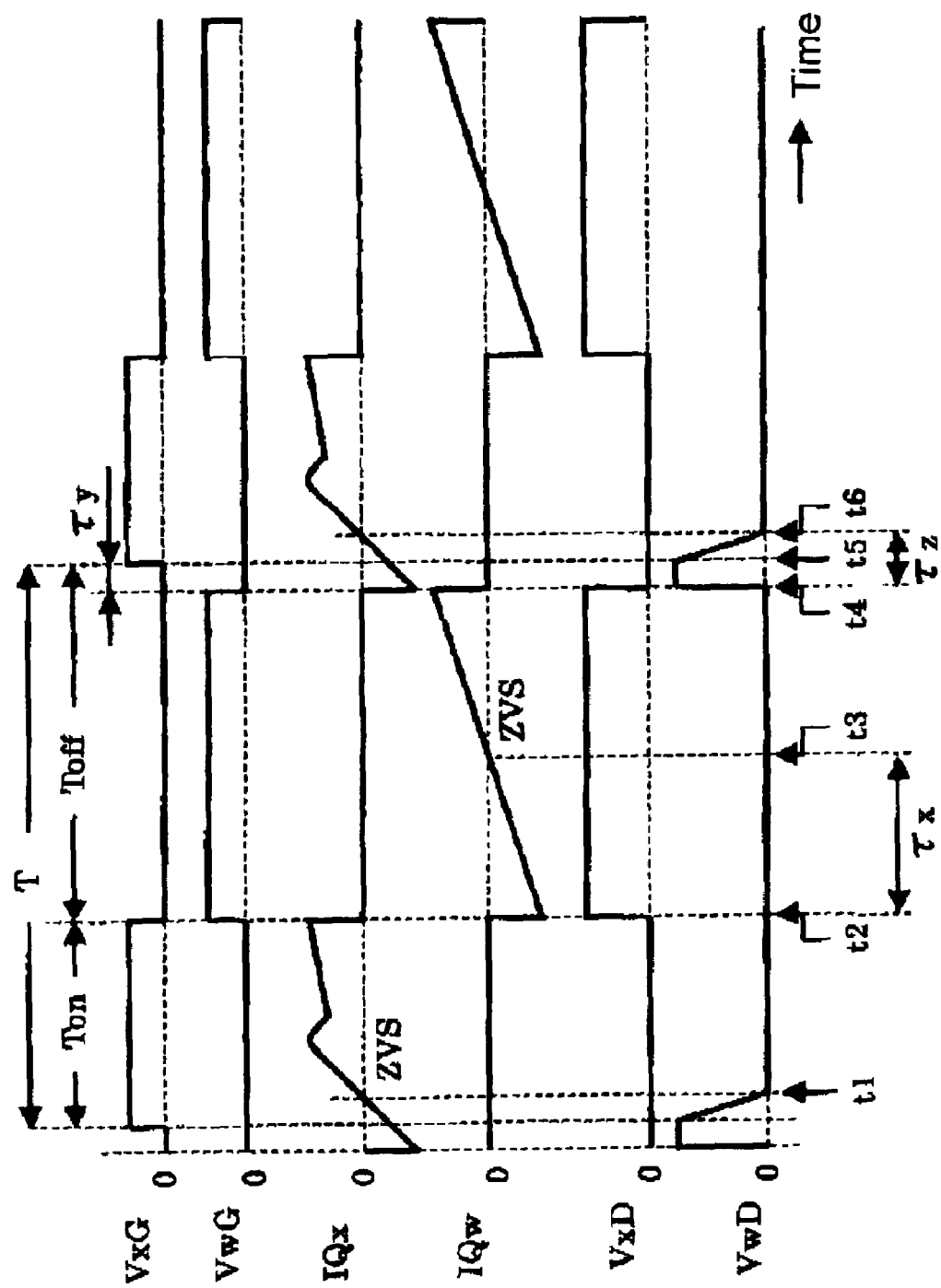
FIG. 2 are plots of the voltages and the current waveforms which correspond to the circuit arrangement of the DC—DC converter according to the first aspect of the invention.

FIG. 1 shows the arrangement of the circuit of a DC—DC converter of the invention in a simplified representation. FIG. 2 shows essentially the respective waveform in the circuit shown in FIG. 1.

This circuit has the same arrangement as in the conventional DC—DC converter of the voltage reduction-buck type as a foundation, in which the following takes place:

during the interval in which the main switching device (Qx), which includes a FET or the like, is in the ON state, a current which originates from the DC source (Vin) flows via the main coil (Lx), which is series connected to the main switching device (Qx). Here furthermore, the smoothing capacitor (Cx) of the main coil (Lx), which is connected to the terminal opposite the main switching device (Qx) is charged, current is supplied to the load (Zx) which is connected in parallel to the smoothing capacitor (Cx), and moreover, energy in the form of a flux is stored in the main coil (Lx). During the interval in which the main switching device (Qx) is in the OFF state, the smoothing capacitor (Cx) is charged by the energy stored in the main coil (Lx) in the form of a flux via the fly-wheel diode (Dx) in which a cathode is connected to one node between the main switching device (Qx) and the main coil (Lc), and current is supplied to the load (Zx).

In this circuit arrangement, in addition to the same arrangement as the arrangement of the conventional DC—DC converter of the voltage reduction-buck type, the following are provided:

the series connection in which the auxiliary switching device (Qw) and the resonant capacitor (Cw) are connected in series, the auxiliary coil (Lw) and the DC source (Vin) are connected in series and thus form a closed loop; and the main switching device (Qx) and the fly-wheel diode (Dx) are connected in series to the series connection.

Here, the basic principle is that the main switching device (Qx) and the auxiliary switching device (Qw) are operated such that one of the two is shifted into the OFF state when the other is in the ON state. However, control is exercised such that the auxiliary switching device (Qw) is shifted beforehand into the OFF state by a switch closing prohibition interval (τy), which is described below before the main switching device (Qx) is shifted into the ON state.

During the interval shown in FIG. 2, from a time (t1) until a time (t2) is reached, the main switching device (Qx) is in the ON state. However, the auxiliary switching device (Qw) is in the OFF state. Current supply from the DC source (Vin) to the load side is therefore carried out via the auxiliary coil (Lw).

During the interval from the time (t1), which was described above using FIG. 2, until the time (t2) is reached, current flows in the auxiliary coil (Lw) and magnetic energy is stored in it. This energy is consumed in order to later carry out resonant operation.

If next, at the time (t2), the main switching device (Qx) is shifted into the OFF state, as is described below, the voltage of the DC source (Vin) is applied to the main switching device (Qx). In the parasitic electrostatic capacitance of the main switching device (Qx), therefore the electric charge, is charged up to this voltage.

At the time (t2), since energy is stored in the auxiliary coil (Lw) at the same time, the resonant current flows without interruption in the closed loop which includes the DC source (Vin), the auxiliary coil (Lw), the resonant capacitor (Cw) and the auxiliary switching device (Qw). With respect to the auxiliary switching device (Qw), the current begins to flow, however, via an antiparallel diode (Dqw) which is connected in parallel thereto.

The antiparallel diode (Dqw) is present as an outside element, for example, in the case in which the auxiliary switching device (Qw) is a MOSFET. It can also be used easily as such.

With respect to the timing for turning on the auxiliary switching device (Qw), it is advantageous to shift as quickly as possible the auxiliary switching device (Qw) into the ON state while ensuring enough time for preventing this timing from coinciding with the ON interval of the main switching device when the main switching device (Qx) is shifted into the OFF state. The reason for this is that, during the interval in which current is flowing in the antiparallel diode (Dqw), a forward voltage of the antiparallel diode (Dqw) forms and that if in doing so the auxiliary switching device (Qw) is in the ON state, the forward voltage of the antiparallel diode (Dqw) can be reduced. By the same principle as in the case of a so-called synchronous rectification, the loss in the above described antiparallel diode (Dqw) and in the auxiliary switching device (Qw) can be reduced. This is one of the advantages of the invention.

Since the peak value of the resonant voltage applied to the resonance capacitor (Cw) is changed by the different constants of the components comprising the circuit, a combination of different constants with one another, in conjunction with the maximum ratings of the components, can be used, and the costs are advantageous.

The peak value of the voltage which has been applied to the resonant capacitor (Cw) is essentially proportional to the output wattage of the DC—DC converter of the voltage reduction-buck type. For example, for constant power regulation, the peak value of the voltage applied to the resonant capacitor (Cw) is essentially constant. In the case of a small output voltage, the peak value of the voltage applied to the resonant capacitor (Cw) is reduced, by which the possibility arises that resonant operation does not take place to a sufficient degree. However, since the output wattage is small, and since originally the switching loss of the invention is also small, this is not regarded as disadvantageous. Therefore, to carry out resonant operation under a condition which is similar to the maximum utilization output wattage, the different constants of the components comprising the circuit can be adjusted.

In the circuit arrangement of the invention, by the measure that there are an auxiliary coil (Lw) and a resonant capacitor (Cw) which are independent of the basic (conventional) DC—DC converter part of the voltage reduction-buck type, and that resonant operation is carried out, a reduction of the switching loss is desired. Therefore, the different constants of the switching devices comprising the resonant circuit, i.e., the parameters of the resonant circuit, can be adjusted essentially independently.

Therefore, it is possible to engineer, for example, to set the inductance of the auxiliary coil (Lw) to be intentionally smaller than the inductance of the main coil (Lx) and still achieve good resonant operation. This measure of the invention results in that, when the resonant capacitor has a large enough capacitance, basic operation of the DC—DC converter part of the voltage reduction-buck type is fixed depending largely only on the inductance of the main coil (Lx), even under the conditions under which the output voltage changes greatly, as in the case in which the high pressure discharge lamp is used as a load.

On the other hand, since the auxiliary coil (Lw) is located in the line path in which energy is supplied to the basic DC—DC converter part of the voltage reduction-buck type, the magnetic energy which is stored in the auxiliary coil (Lw) during the interval of the ON state of the main switching device (Qx), is essentially proportional to the energy supplied to the load for each period of switching operation. This relation hardly depends on the voltage applied to the load.

The voltage charged in the resonant capacitor (Cw) therefore does not change greatly either under the conditions under which the output voltage changes greatly, when the wattage supplied to the load does not change greatly. The resonance phenomenon in the main coil (Lw), which has only an intentionally set smaller inductance than the main coil (Lx), therefore becomes less susceptible to the fluctuation of conditions for the load. This feature is one of the major advantages of the invention.

At the time (t3) which is shown in FIG. 2, the resonant voltage of the resonant capacitor (Cw) reaches a peak value, and the resonant current flowing in the auxiliary coil (Lw) reaches 0 and then begins to flow in the direction opposite the previous direction. As was described above, it becomes apparent that zero voltage switching is achieved when the transition of the above described auxiliary switching device (Qw) into the ON state is completed within an interval (τx) which begins at the time (t2) which is prior to the time (t3) and at which the main switching device (Qx) is shifted into the OFF state. Furthermore, during this interval, current is flowing in the antiparallel diode (Dqw) and only the forward voltage of the antiparallel diode (Dqw) is formed for the voltage of the auxiliary switching device (Qw).

This means that by setting the timing of shifting the auxiliary switching device (Qx) into the ON state to be shorter than the length of time of τxx of the interval (τx) such that enough time is ensured to prevent this timing from coinciding with the ON interval of the main switching device (Qx), the switching loss can also be kept low during the switching operation of the auxiliary switching device (Qw). This is one of the major advantages of the invention.

As was described above, control is exercised such that, before the main switching device (Qx) reaches the ON state, the auxiliary switching device (Qw) is shifted beforehand into the OFF state at the time (t4) shown in FIG. 2 by a switch closing prohibition interval (τy).

As was described above, at the time (t2) within the interval during which the forward current is flowing in the main switching device (Qw), the main switching device (Qx) is shifted into the OFF state, thus the current of the auxiliary coil (Lw) is continued. In this way, current flows in the closed loop which includes DC source (Vin), the auxiliary coil (Lw), the above described resonant capacitor (Cw) and the antiparallel diode (Dqw) of the auxiliary switching device (Qw). In the same way, this time, in the line path which passes through the region in which the main switching device (Qx) is present and which is located outside of the closed loop, current begins to flow in such a way that the current of the auxiliary coil (Lw) is continued as the auxiliary switching device (Qw) reaches the OFF state at the time (t4).

However, in this case, since the direction of the current of the auxiliary coil (Lw) which continues to try to flow is opposite that at the time (t2), the current also begins to flow in the line path which passes through the area in which the main switching device (Qx) is present in the opposite direction, i.e., in the direction in which the backward current flows in the main switching device (Qx). This means that current begins to flow via the line path which includes the above described auxiliary coil (Lw), the fly-wheel diode (Dx) and the antiparallel diode (Dqx) which is connected parallel to the main switching device (Qx), from the grounding terminal of the DC source (Vin) to the positive terminal.

Here, the electrical charge which is charged in the parasitic electrostatic capacitance of the main switching device (Qx) is withdrawn. Afterwards, during the interval in which current is flowing in the antiparallel diode (Dqx), a state is maintained on the two ends of the main switching device (Qx) in which only a forward voltage of the antiparallel diode (Dqx) is formed.

The antiparallel diode (Dqw) is present as an outside element, for example, in the case in which the auxiliary switching device (Qw) is a MOSFET. It can also be used simply as such.

The phenomenon that by operation at time (t4) current flows from the grounding terminal of the DC source (Vin) to the positive terminal means that the energy of resonance operation which has been stored in the auxiliary coil (Lw) is regenerated in the DC source (Vin). One of the major advantages of the invention is that energy is not wasted.

As was described above, the main switching device (Qx) at the time (t5) shown in FIG. 2 after expiration of the switch closing prohibition interval (τy) is shifted into the ON state after the auxiliary switching device (Qw) reaches the OFF state. This is completed within an interval with a state in which current is flowing in the antiparallel diode (Dqx) and in which only the forward voltage of the antiparallel diode (Dqx) forms on the two ends of the main switching device (Qx).

By this measure, the current which is flowing in the antiparallel diode (Dqx) finally reaches 0 at the time (t6) shown in FIG. 2. Zero voltage switching can be achieved when the current is next inverted and flows in the forward direction of the main switching device (Qx). This means that in transition operation of the main switching device (Qx) into the ON state the switching loss can be kept low and the advantage of the invention can be exploited.

FIG. 2 shows the interval (τz) from the time (t4) at which the auxiliary switching device (Qw) is shifted into the OFF state until the time (t6) at which the current flowing in the antiparallel diode (Dqx) reaches 0. The interval is depicted in the figure as relatively long for the ease of drawing. In actual switching operation, the interval (τz) is a short interval since the parasitic electrostatic capacitance of the main switching device (Qx) is normally a few pF to a few dozen pF, therefore is small.

During the switch closing prohibition interval (τy), it is necessary to set the timing by which the auxiliary switching device (Qx) is shifted into the ON state to be shorter than the length of time of τzz of the interval (τz) such that enough time is ensured to prevent this timing from coinciding with the ON interval of the above described main switching device (Qx). When this condition is satisfied, the switch closing prohibition interval (τy) can be set to be constant or changed according to conditions.

As was described above, according to the first aspect of the invention, in the transition operation of the main switching device (Qx) into the ON state, the switching loss can be reduced. The auxiliary coil (Lw) is arranged independently of the circuit arrangement of the basic DC—DC converter of the voltage reduction-buck type. Because the inductance of the auxiliary coil (Lw) is intentionally set to be smaller than the inductance of the main coil (Lx), and because the resonant capacitor is set to be great, the resonance phenomenon for the auxiliary coil (Lw) becomes less susceptible to the fluctuation of conditions at the load. Therefore, the switching loss can be reduced in a wide, variable range of the continuity ratio of the main switching device.

Furthermore, if the parameters of the auxiliary coil (Lw) and of the resonant capacitor (Cw) are set in a suitable manner hereby, in transition operation of the auxiliary switching device (Qw) into the ON state the switching loss can be reduced. Furthermore, the energy of the resonant operation of the auxiliary coil (Lw) in the DC source (Vin) can be regenerated. Therefore, as a whole, a DC—DC converter with high efficiency can be built.

Figure 14:
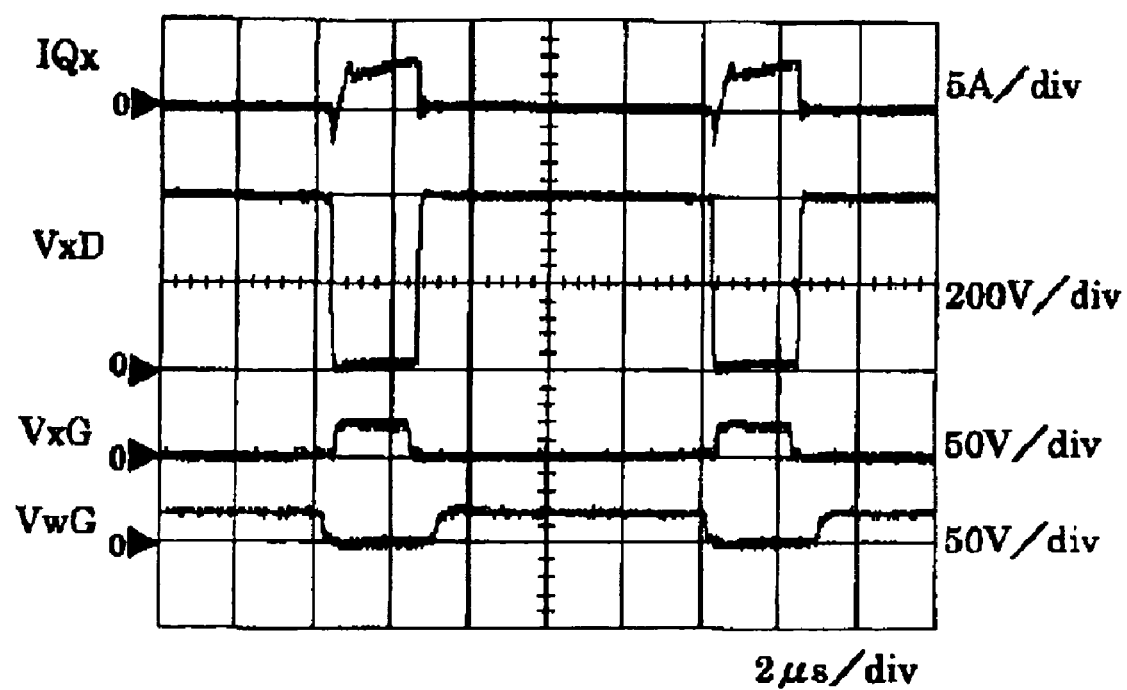
FIG. 14 shows plots of the voltages measured in reality and of current waveforms of the DC—DC converter according to the first aspect.
Figure 15:
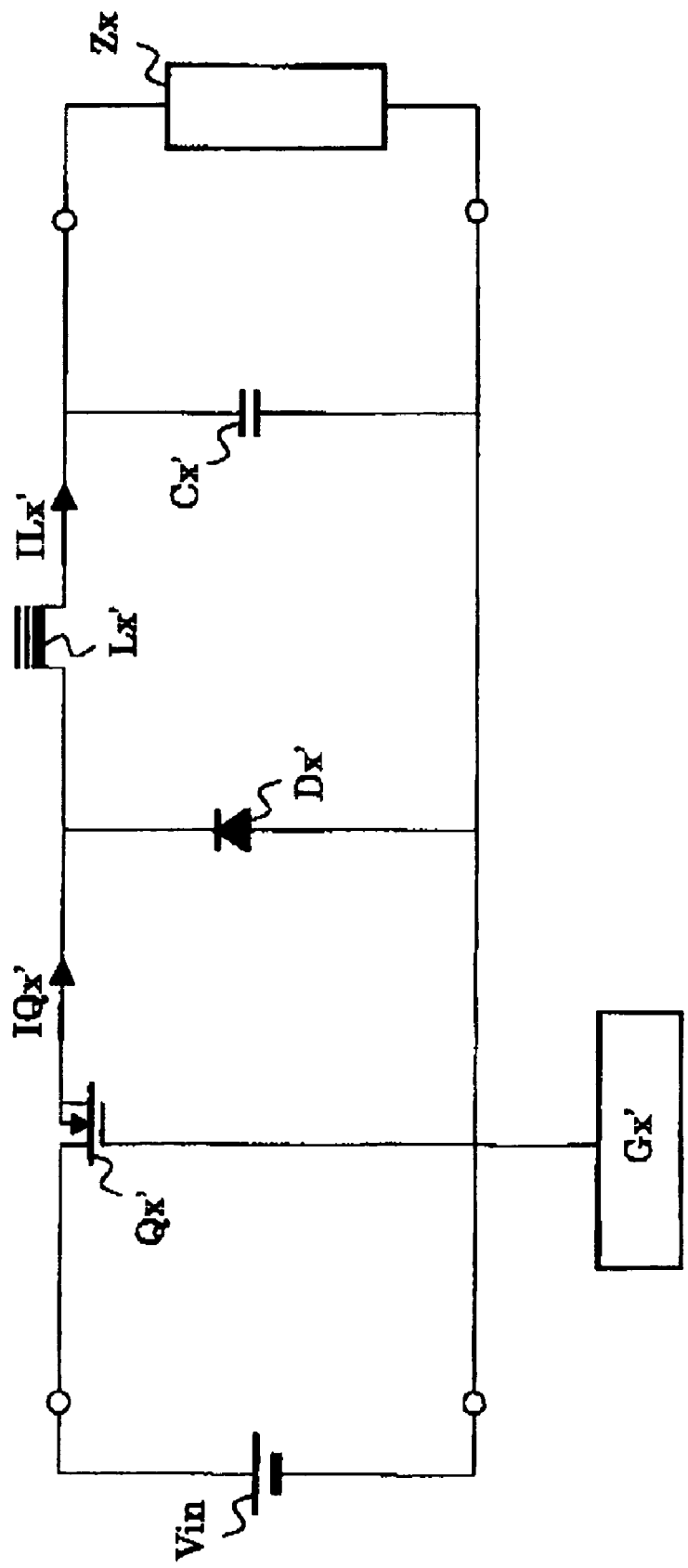
FIG. 15 is a schematic of the circuit arrangement of a conventional DC—DC converter of the voltage reduction-buck type.
Figure 16:
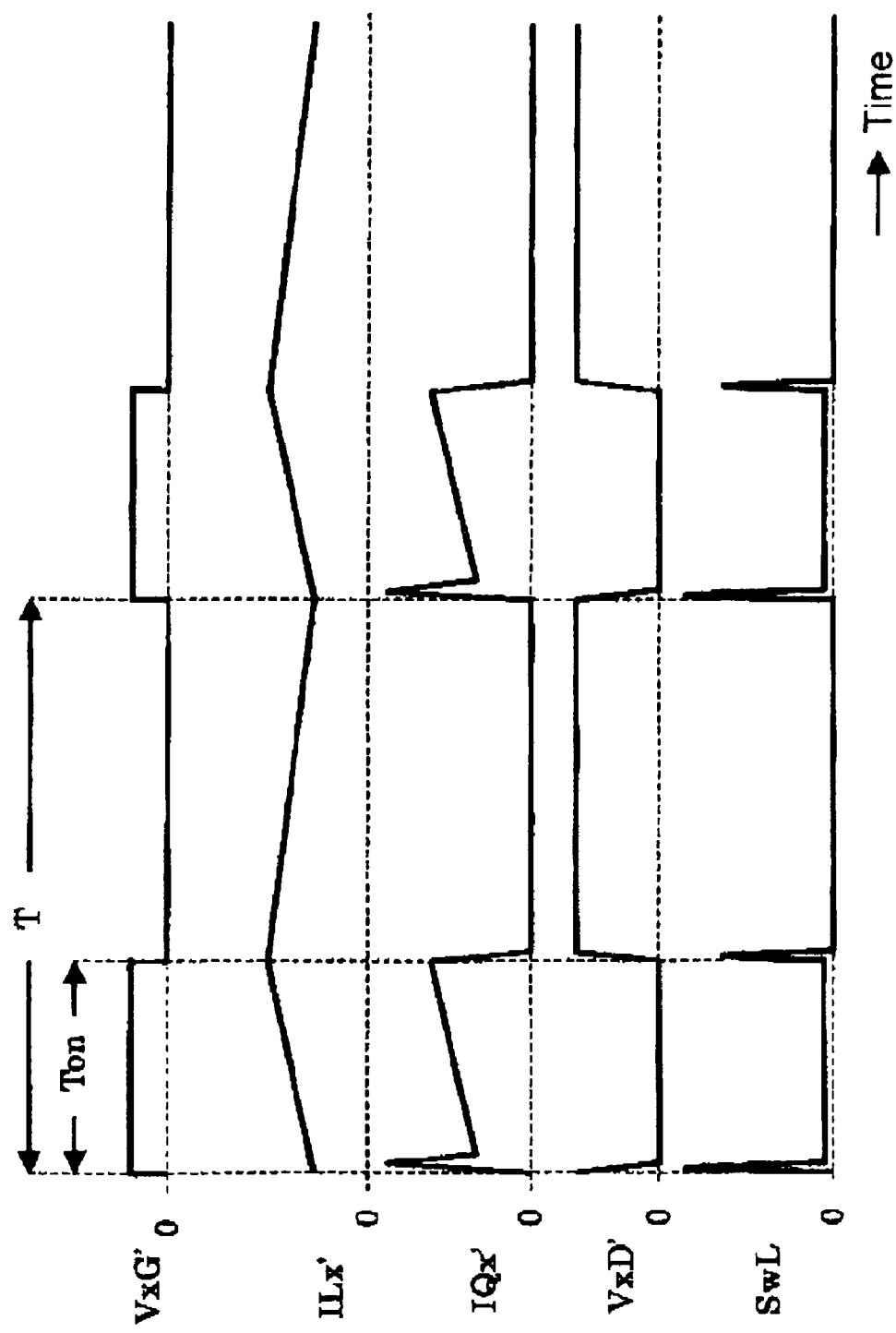
FIG. 16 are plots of the voltages and of the current waveforms of the circuit arrangement of a conventional DC—DC converter of the voltage reduction type.

FIG. 14 shows, for information purposes, the waveforms of the main waveforms measured in reality for the circuit shown above using FIG. 1. The switching devices and the parameters in this circuit are shown below.

auxiliary coil (Lw): 35 μH
resonant capacitor (Cw): 1 μF
main switching device (Qx): 2 SK 2843 (produced by Toshiba)
auxiliary switching device (Qw): 2 SK 2843 (produced by Toshiba)
main coil (Lx): 2.2 mH
fly-wheel diode (Dx): YG 1912S6 (produced by Fujidenki)
smoothing capacitor (Cx): 0.47 μF
switching frequency: 100 kHz
load (Zx): 30 Ω
input voltage: 370 V
output wattage: 150 W
output voltage: 67 V
output current: 2.24 A The advantage of the invention according to its second aspect is described below. As was described relative to the prior art, the discharge voltage of a high pressure discharge lamp changes greatly and also depends vigorously on the discharge state, i.e., the state in which a no-load voltage is applied (state before the start of discharge), the glow discharge state, the state of a transient arc discharge, the state of a steady-state arc discharge. Therefore, the converter for supply of a high pressure discharge lamp is required to have the property of enabling a prompt change of the continuity ratio according to the discharge voltage of the high pressure discharge lamp in a wide, variable range with PWM control. Furthermore, there is a demand for a property which enables maintenance of operation in which the switching loss is reduced by resonance operation.

As was described above, in the DC—DC converter of the voltage reduction-buck type of the invention there is an auxiliary coil (Lw) of the circuit arrangement of the underlying DC—DC converter of the voltage reduction-buck type. Because the inductance of the auxiliary coil (Lw) is set to be intentionally smaller than the inductance of the main coil (Lx), the resonance phenomenon for the auxiliary coil (Lw) becomes less susceptible to the fluctuation of conditions at the load. Therefore, in a wide, variable range of the continuity ratio of the main switching device the switching loss can be reduced. It is therefore suited as a converter for supply of a high pressure discharge lamp. A device for operating a high pressure discharge lamp which is arranged using it therefore works advantageously.

Figure 3:
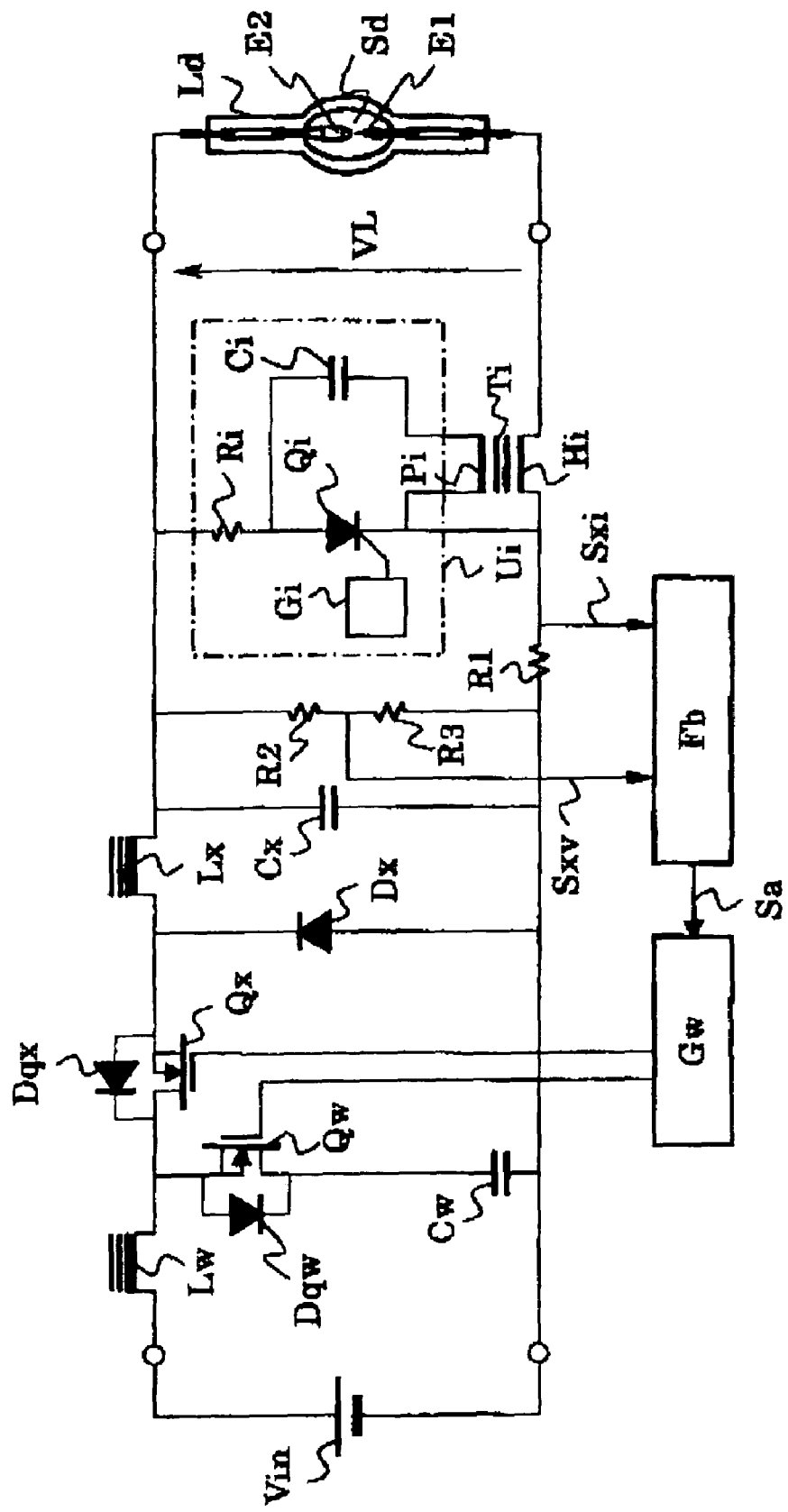
FIG. 3 is a schematic of the circuit arrangement of a DC—DC converter described in the second aspect of the invention.

FIG. 3 shows the circuit arrangement of a device for operating a high pressure discharge lamp (Ld) in a simplified representation in which the DC—DC converter for supplying a high pressure discharge lamp is the DC—DC converter of the voltage reduction-buck type of the invention which was described above using FIG. 1.

To obtain a device for operating a high pressure discharge lamp (Ld), in addition to FIG. 1, there are a starter (Ui), a shunt resistor (R1) as the output current detector, voltage divider resistors (R2, R3) as the output voltage detectors and a feedback control element (Fb).

In the starter (Ui), a capacitor (Ci) is charged via a resistor (Ri) by a lamp voltage (VL). When a gate driver circuit (Gi) is activated, by closing the switching device (Qi) which includes a thyristor or the like, the capacitor (Ci) is discharged by the primary winding (Pi) of the transformer (Ti), by which in the secondary winding (Hi) a high voltage pulse is formed and applied between the electrodes (E1, E2) of the two poles of the high pressure discharge lamp (Ld). In this way, within the discharge space (Sd) an insulation breakdown occurs and the discharge of the high pressure discharge lamp (Ld) begins.

A lamp current determination signal (Sxi) is input by the shunt resistor (R1) and lamp voltage determination signals (Sxv) are input by the voltage divider resistors (R2, R3) to the feedback control element (Fb) from which a PWM signal (Sa) is sent to the driver control element (Gw). The driver control element (Gw) carries out drive control of the main switching device (Qx) and of the auxiliary switching device (Qw) in this way.

The feedback control element (Fb) based on the lamp voltage determination signal (Sxv) before the start of discharge of the high pressure discharge lamp (Ld) carries out feedback control of the no-load voltage. That the starter (Ui) produces a high voltage pulse and that the discharge of the high pressure discharge lamp (Ld) has begun can be determined by the feedback control element (Fb), for example, by the lamp current determination signal (Sxi).

Furthermore, the feedback control element (Fb) carries out the following:

The lamp wattage setpoint is divided by the lamp voltage value which is computed by the lamp voltage determination signal (Sxv);

In this way, the lamp current setpoint is computed at this instant;

A lamp current setpoint signal which corresponds to this lamp current setpoint is generated internally; and Feedback control of the lamp current is carried out such that the difference between it and the lamp current determination signal (Sxi) is reduced.

However, since, as was described above, immediately after the transition into a transient arc discharge via a glow discharge, the lamp voltage is low and since the lamp current setpoint which is computed according to this lamp voltage value becomes unduly large, it is advantageous to exercise control such that the lamp current value is kept at the upper boundary value until finally the lamp voltage increases and until an appropriate lamp current setpoint is computed.

Figure 4:
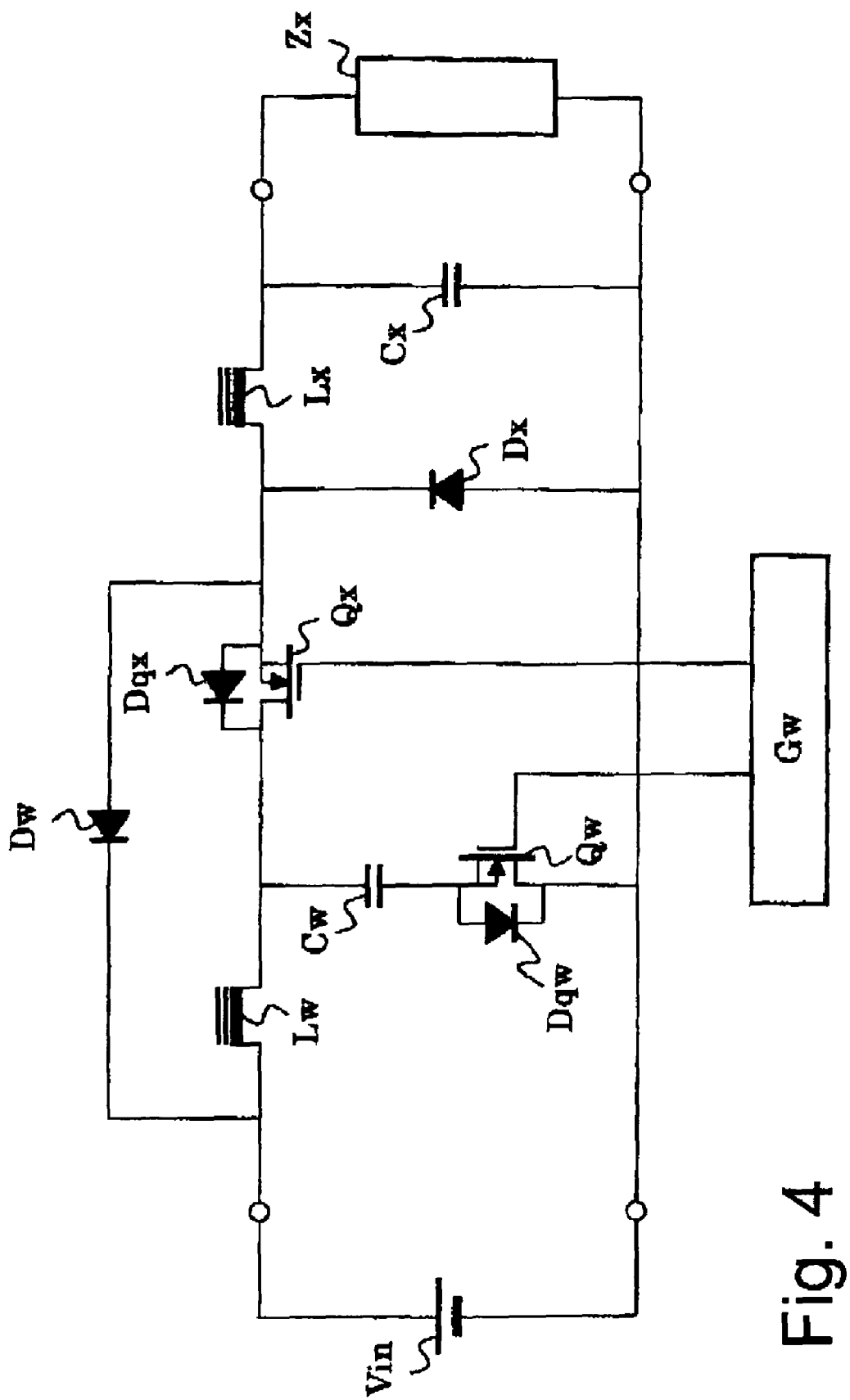
FIG. 4 shows a schematic circuit of an embodiment of the invention described in the first aspect.

FIG. 4 shows an embodiment of the invention according to its first aspect. A version of a DC—DC converter of the invention is shown here in which the positions of the resonant capacitor (Cw) and the auxiliary switching device (Qw) have been changed compared to the circuit arrangement described above using FIG. 1. Here, the same action as in FIG. 1 can be used.

In the circuit arrangement shown in FIG. 4, a diode (Dw) is connected in parallel to the series connection of the auxiliary coil (Lw) to the main switching device (Qx) in order to avoid the following case.

There is specifically a case in which at the electrical potential of the node of the nodal point between the main switching device (Qx) and the main coil (Lx) in the transition of the main switching device (Qx) into the ON state relatively great ringing arises. When due to the presence of this ringing neither the disadvantage that for example the rated values of the switching devices are exceeded nor a similar disadvantage occurs, the diode (Dw) can also be omitted.

Figure 5:
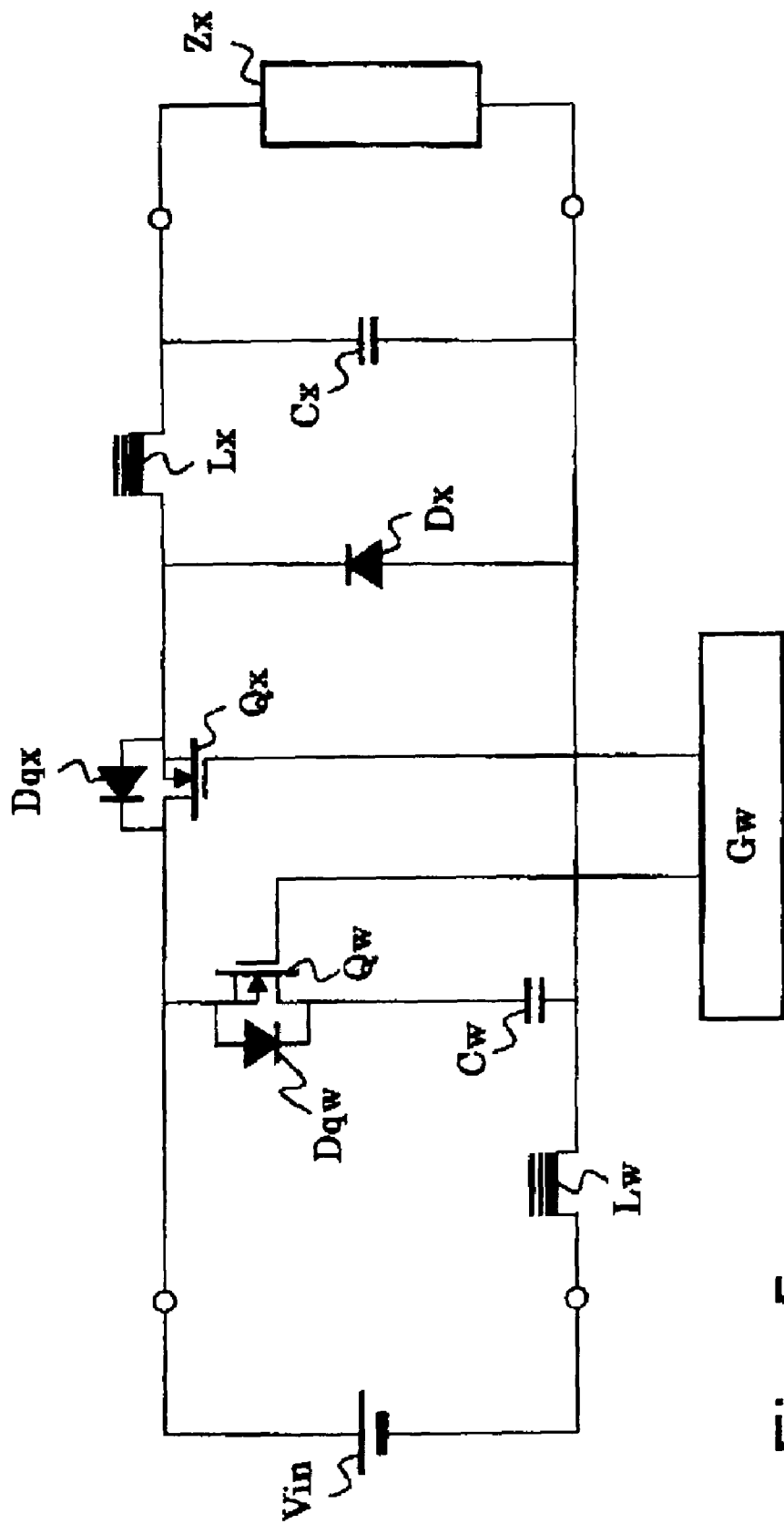
FIG. 5 shows a schematic circuit of an embodiment of the invention described in aspect 1.

FIG. 5 shows one embodiment invention in its first aspect:

Here, an embodiment of a DC—DC converter of the invention is shown in which the auxiliary coil (Lw) is located on a line (ground line) of the DC source (Vin) which is opposite the line on which the main switching device (Qx) and the main coil (Lx) are located next to one another. Here the same action as in FIG. 1 can be used.

Figure 6:
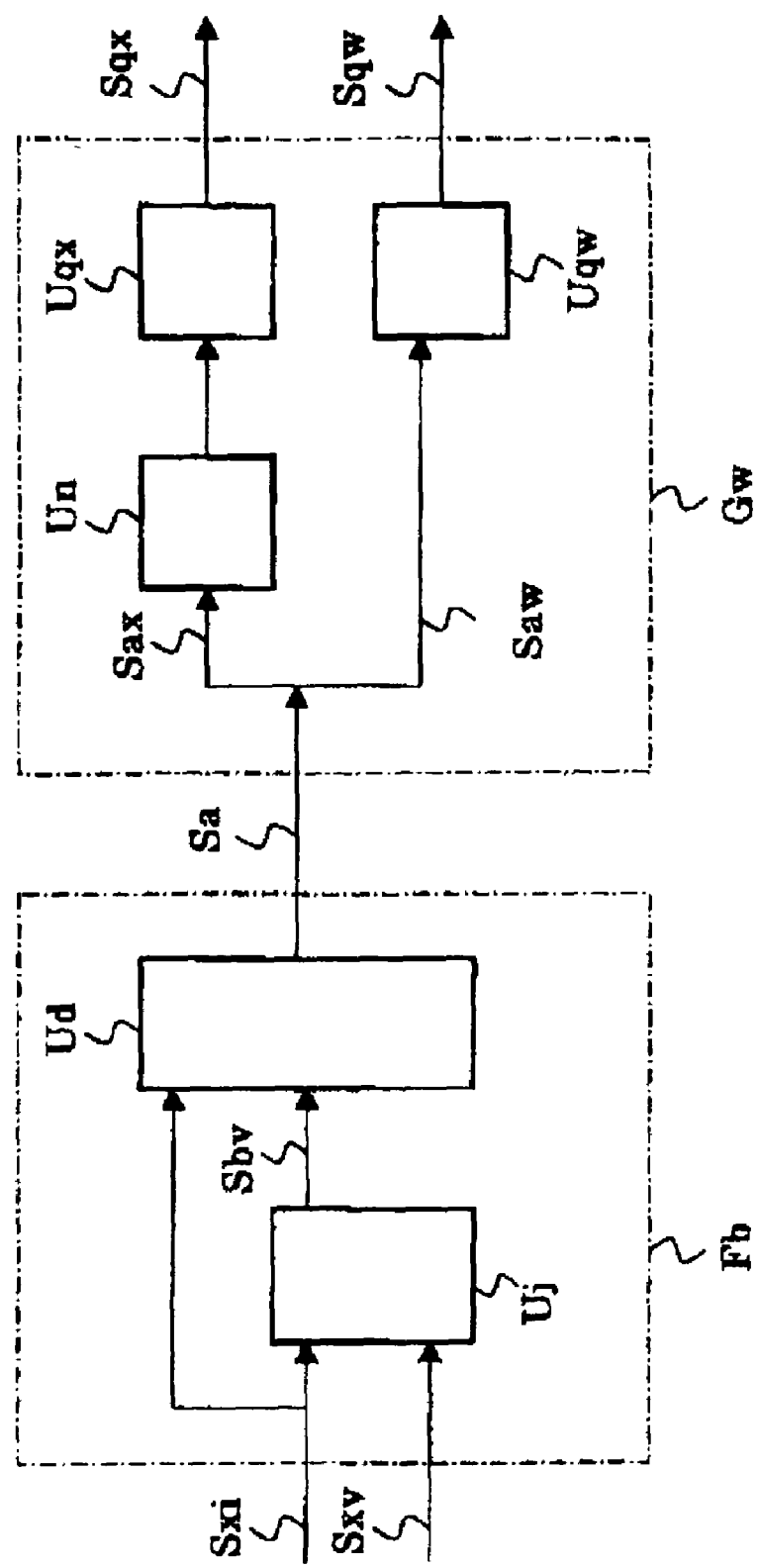
FIG. 6 shows a schematic of the arrangement of a driver control element and a feedback control element of the DC—DC converter of the invention.

FIG. 6 shows the arrangement of the driver control element (Gw) and of the feedback control element (Fb) of a DC—DC converter of the invention in a simplified representation.

The feedback control element (Fb) includes the following:
an arithmetic circuit (Uj) which computes the lamp current setpoint by dividing the lamp wattage setpoint by a lamp voltage value which is computed on the basis of lamp voltage determination signal (Sxv); and
a driving capacity control circuit (Ud) which carries out pulse width modulation with feedback such that the difference between the lamp current setpoint signal (Sbv) which has been computed by this arithmetic circuit (Uj) and the lamp current determination signal (Sxi) is reduced at this time.

The PWM signal (Sa) is output by the driving capacity control circuit (Ud). Since the main switching device (Qx) and the auxiliary switching device (Qw) must be shifted in alternation into the ON state, the main switching PWM signal (Sax) which is to become a driver signal of the main switching device (Qx), and the auxiliary switching PWM signal (Saw) which is to become an inversion signal of it, i.e. a driver signal of the auxiliary switching device (Qw), are generated. They are converted by the driver control element (Gw) into signals which are used to drive the switching devices.

Since control is exercised in such a way that only after the auxiliary switching device (Qw) reaches is the main switching device (Qx) shifted into the ON state within a given time τZZ, by adding a delay circuit (Un) for delaying the timing for driving the main switching device (Qx), this time can be regulated.

Next, there are circuits for driving the main switching device (Qx) and the auxiliary switching device (Qw), for example, driver circuits (Uqx, Uqw) including a pulse transformer, a high-side-driver or the like. In this way, for the respective switching device, driver signals (Sqx, Sqw) are generated and the respective switching device is subjected to ON-OFF control.

A microprocessor (not shown) can be installed in the feedback control element (Fb) and thus the discharge state of the high pressure discharge lamp can be identified and a relatively complicated sequence which is subject to normal operation control can be processed. Here, it is advantageous to proceed as follows:
The lamp voltage determination signal (Sxv) is converted by AD conversion into a lamp voltage value;
The computation of the lamp current setpoint which satisfies a lamp wattage setpoint is done by the microprocessor.
A lamp current setpoint signal is generated by a D/A converter.

Figure 7:
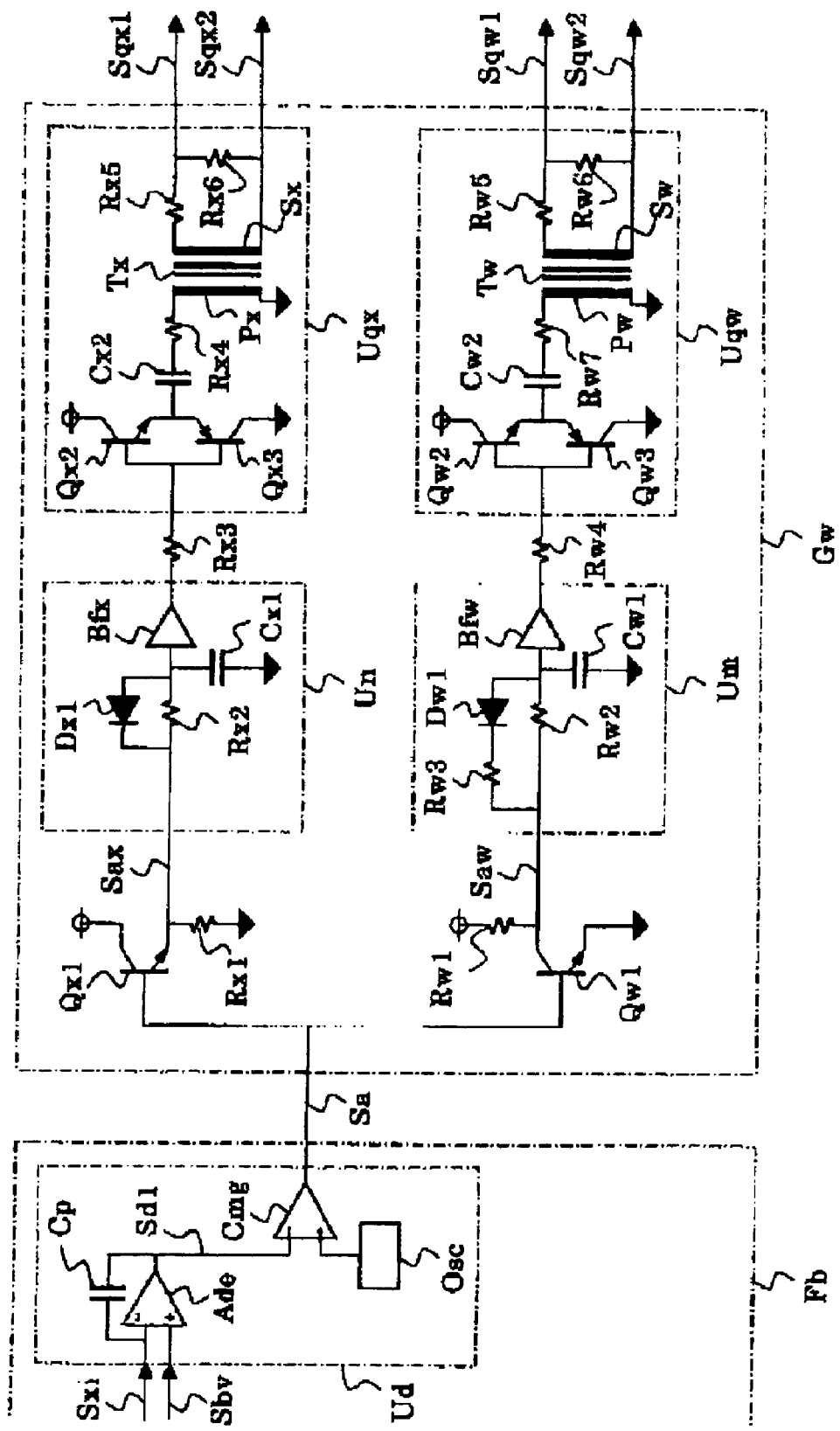
FIG. 7 shows a schematic of an embodiment of the circuit arrangement of the driver control element and of part of the feedback control element of a DC—DC converter of the invention.

FIG. 7 shows an embodiment of part of the feedback control element (Fb) of the invention and of the circuit arrangement of the driver control element (Gw) of a DC—DC converter.

In the driving capacity control circuit (Ud), the error of the lamp current determination signal (Sxi) at this time is integrated with respect to the lamp current setpoint signal (Sbv) using an error integrator which includes a capacitor (Cp) and an operational amplifier (Ade). The integrated integration signal (Sd1) is compared using a comparator (Cmg) to a sawtooth wave which has been produced in an oscillator for producing sawtooth waves (Osc). In this way, the PWM signal (Sa) is generated such that a signal is obtained for which the magnitude of the continuity ratio changes according to the magnitude of the integration signal (Sd1), i.e., a driver signal is obtained which is subjected to PWM control for the main switching device (Qx).

For the gate signal of the auxiliary switching device (Qw), the main switching device (Qx) and the auxiliary switching device (Qw) are shifted in alternation into the ON state. Therefore, the PWM signal (Sa) and an inversion signal thereof are needed. As a result, with respect to the PWM signal (Sa), there are two switching devices (Qx1, Qw1). The switching device (Qx1) is an emitter followed by a resistor (Rx1) and generates a main switching PWM signal (Sax) which is an in-phase signal like the PWM signal (Sa). A resistor (Rw1) is connected to the switching device (Qw1). Furthermore, the switching device (Qw1) is an emitter ground and generates an auxiliary switching PWM signal (Saw) which is an inversion signal with respect to the PWM signal.

In doing so, the main switching PWM signal (Sax) is output via a buffer (Bfx) to the next stage, since a delay circuit is formed which follows the time constant of a CR circuit includes a resistor (Rx2) and a capacitor (Cx1). In this delay circuit, in the case of reaching "High", a delay can be taken to a sufficient extent. Conversely, in the case in which the voltage of the buffer (Bfx) drops from "High" to "Low", control is exercised in such a way that parallel to the resistor (Rx2) a diode (Dx1) is added, an electrical charge is quickly withdrawn from the capacitor (Cx1) and thus the delay time is shortened. Therefore, only the signal is delayed when the main switching device (Qx) is turned on.

Then, the signal which has been output from the buffer (Bfx) is transmitted via a base resistor (Rx3) to a driver circuit (Uqx) for driving the main switching device (Qx). From the nodal point between the driver circuit (Uqx) and the switching devices (Qx2, Qx3), a signal is transmitted to the primary winding (Px) of the pulse transformer (Tx) via a capacitor (Cx2) and a resistor (Rx4) as the current limitation resistor. A resistor (Rx5) which is to become the gate resistor of the main switching device (Qx) is connected from the secondary winding (Sx) of the pulse transformer (Tx). A resistor (Rx6) is connected thereto and is connected between the drain and the source electrode for smoothly turning off the main switching device (Qx). These signals (Sqx1, Sqx2) are transmitted to the main switching device (Qx).

On the other hand, a delay is added to the auxiliary switching PWM signal (Saw) by a delay circuit (Um) which likewise includes resistors (Rw2, Rw3), a capacitor (Cw1), a diode (Dw1) and a buffer (Bfw). The signal which has been output via the buffer (Bfw) is transmitted to the switching devices (Qw2, Qw3) via the base resistor (Rw4) and proceeding from the nodal point between the switching devices (Qw2, Qw3) via a capacitor (Cw2) and a resistor (Rw7) as a current limitation resistor to the primary winding (Pw) of the pulse transformer (Tw). A gate resistor (Rw5) of the auxiliary switching device (Qw) and a resistor (Rw6) which is connected between the drain and the source electrode is connected to the secondary winding (Sw) for smoothly turning off the auxiliary switching device (Qw). Generated driver signals (Sqw1, Sqw2) are transmitted to the auxiliary switching device (Qw).

By this arrangement in the control circuit shown in FIG. 7, the device of the invention for operating a high pressure discharge lamp can be controlled with feedback such that the error between the lamp current determination signal (Sxi) and the lamp current setpoint signal (Sbv) decreases.

Here, the main switching device (Qx) and the auxiliary switching device (Qw) can be subjected to ON-OFF control in such a way that the switching loss is reduced. Furthermore, for the main switching PWM signal (Sax) and the auxiliary switching PWM signal (Saw) for the two switching devices, specifically for the main switching device (Qx) and the auxiliary switching device (Qw), there are delay circuits (Un, Um). In this way, the switching devices are prevented from being turned on at the same time.

For example, a TL494 from Texas Instruments or the like can be used as a commercial IC in which functional units such as the operational amplifier (Ade) described above using FIG. 7, the oscillator shown in FIG. 7 for producing sawtooth waves (Osc), the comparator (Cmg) shown in FIG. 7 for comparison with the sawtooth waves, the switching deices (Qx1, Qw1) shown in FIG. 7 and the like are integrated.

Figure 8:
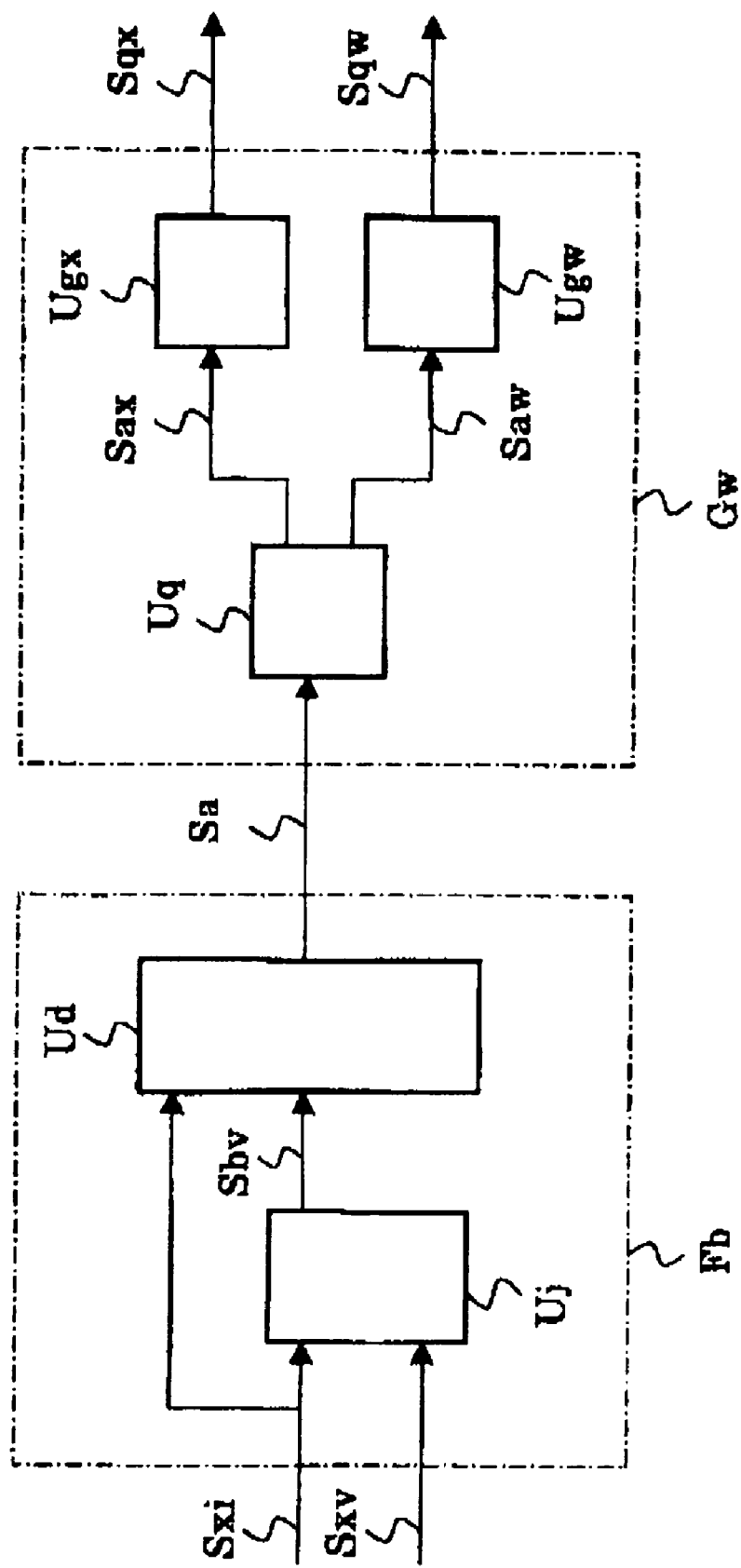
FIG. 8 shows a schematic of the arrangement of the driver control element and of the feedback control element of a DC—DC converter of the invention.

FIG. 8 shows the arrangement of a driver control element (Gw) and the arrangement of a feedback control element (Fb) of the DC—DC converter of the invention in a simplified representation, like FIG. 6.

The PWM signal (Sa) is output from the driving capacity control circuit (Ud). Since here the main switching device (Qx) and the auxiliary switching device (Qw) must be shifted in alternation into the ON state, therefore the main switching PWM signal (Sax) which is to become a driver signal of the main switching device (Qx), and the auxiliary switching PWM signal (Saw) which is to become an inversion signal of it, i.e., a driver signal of the auxiliary switching device (Qw), are generated by a driver circuit (Uq). The driver circuit (Uq) is designed both to drive the switching device and also to produce the auxiliary switching PWM signal (Saw) and the main switching PWM signal (Sax). The timing for driving the main switching device (Qx) and the auxiliary switching device (Qw) is controlled by delay circuits (Ugx, Ugw). They are converted into driver signals (Sqx, Sqw) for driving the switching devices.

Figure 9:
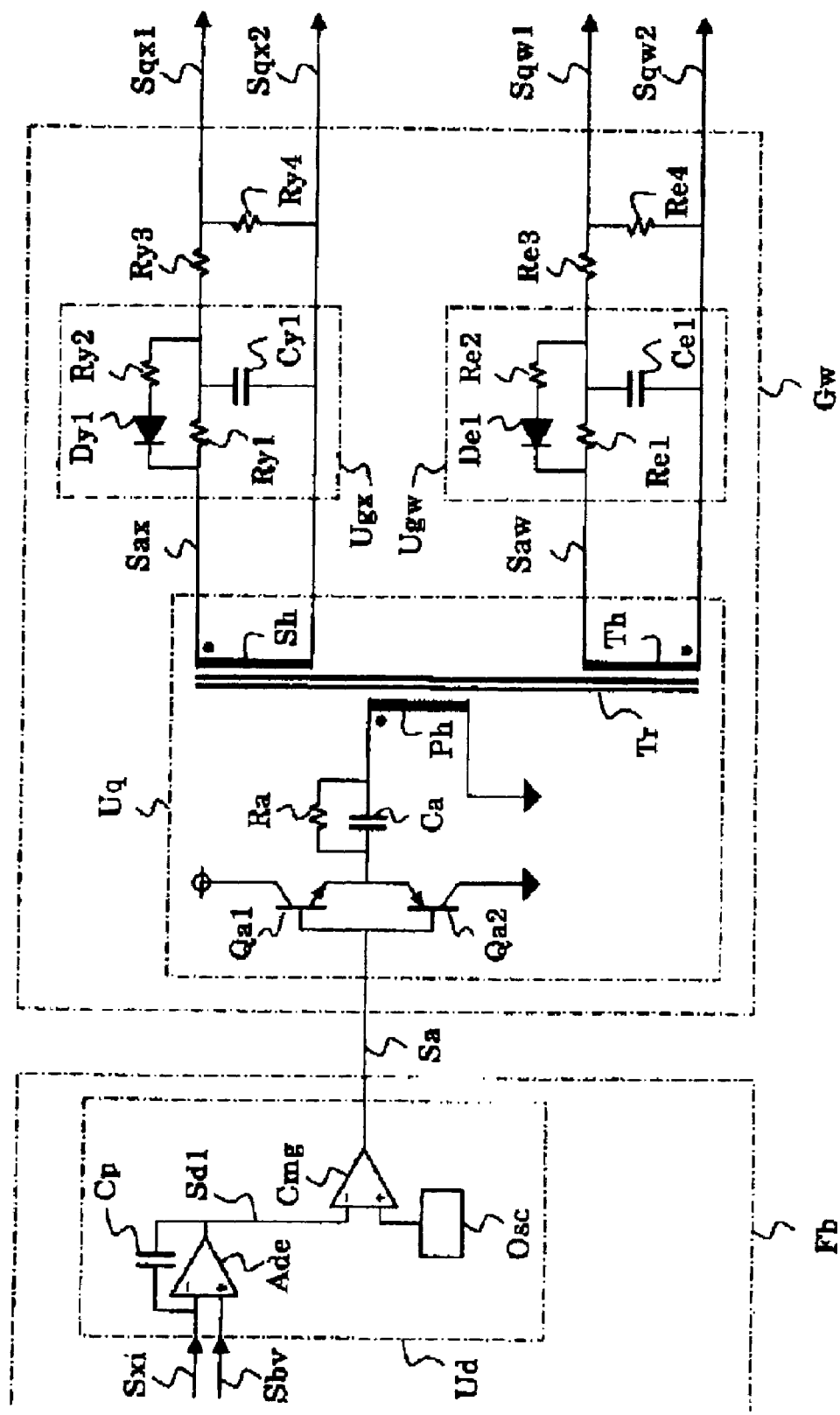
FIG. 9 shows a schematic of an embodiment of the circuit arrangement of the driver control element and of part of the feedback control element of a DC—DC converter of the invention.

FIG. 9 shows an embodiment of the circuit arrangement of part of the feedback control element (Fb) and of the driver control element (Gw) of the DC—DC converter which corresponds to the arrangement described above using FIG. 8.

The PWM signal (Sa), which has been output by the driving capacity control circuit (Ud) in the driver circuit (Uq), passes through the driver circuit which is composed of switching devices (Qa1, Qa2), and through a resistor (Ra) and a capacitor (Ca), by which the primary winding (Ph) of the pulse transformer (Tr) is driven. Here, the secondary winding (Sh) and the secondary winding (Th) are coupled to one another in the pulse transformer (Tr) with reversed polarity. Therefore, the main switching PWM signal (Sax) and the auxiliary switching PWM signal (Saw) can be relatively inverted and generated as isolated signals.

A delay is added to the generated main switching PWM signal (Sax) by the delay circuit (Ugx) composed of the diode (Dy1), resistors (Ry1, Ry2) and a capacitor (Cy1). Driver signals (Sqx1, Sqx2) are produced via resistors (Ry3, Ry4) for gate driving with respect to the main switching device (Qx). Likewise, a delay is added to the auxiliary switching PWM signal (Saw) by the delay circuit (Ugx) composed of the diode (De1), resistors (Re1, Re2) and a capacitor (Ce1). Driver signals (Sqw1, Sqw2) are produced via resistors (Re3, Re4) for gate driving with respect to the auxiliary switching device (Qw).

By this arrangement, a margin can be provided by which the main switching device (Qx) and the auxiliary switching device (Qw) are not shifted into the ON state at the same time, and thus they can be shifted into the ON state in alternation. Since in this circuit arrangement the number of pulse transformers can be reduced compared to the circuit arrangement described in FIG. 7, it can be produced at lower costs.

As was described above using FIG. 2, zero voltage switching is achieved when the transition of the auxiliary switching device (Qw) into the ON state is completed within an interval (τx) which begins before this time, i.e., starting with the time (t2) at which the main switching device (Qx) is shifted into the OFF state. During this interval, current is flowing in the antiparallel diode (Dqw) and as the voltage of the auxiliary switching device (Qw) only the forward voltage of the antiparallel diode (Dqw) is formed. In the case in which this function of zero voltage switching is not used, because the duration of the ON state of the auxiliary switching device (Qw) is kept essentially constant, during operation of the entire circuit (Qw) the limitation of the relative timing when the main switching device (Qx) and the auxiliary switching device (Qw) are being switched can be reduced.

Figure 10:
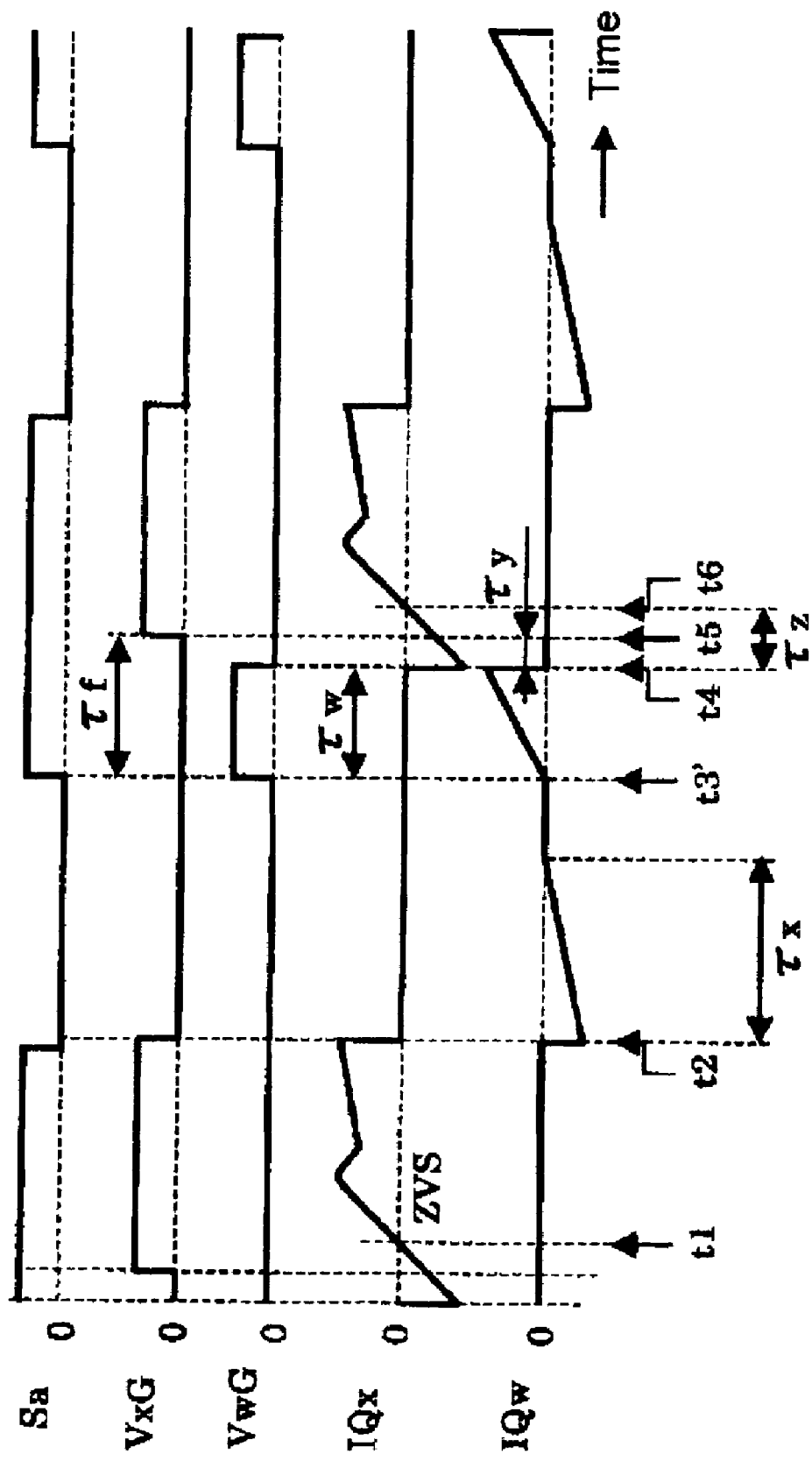
FIG. 10 are plots of the voltages and the current waveforms which correspond to the circuit arrangement of the DC—DC converter according to the first aspect.

As is shown in FIG. 10, for example, the auxiliary switching device (Qw) can also be shifted into the ON state during an interval (τw) which is essentially constant starting at the time (t3') which precedes the time (t5) at which the main switching device (Qx) passes into the ON state by an essentially constant interval (τf).

Figure 11:
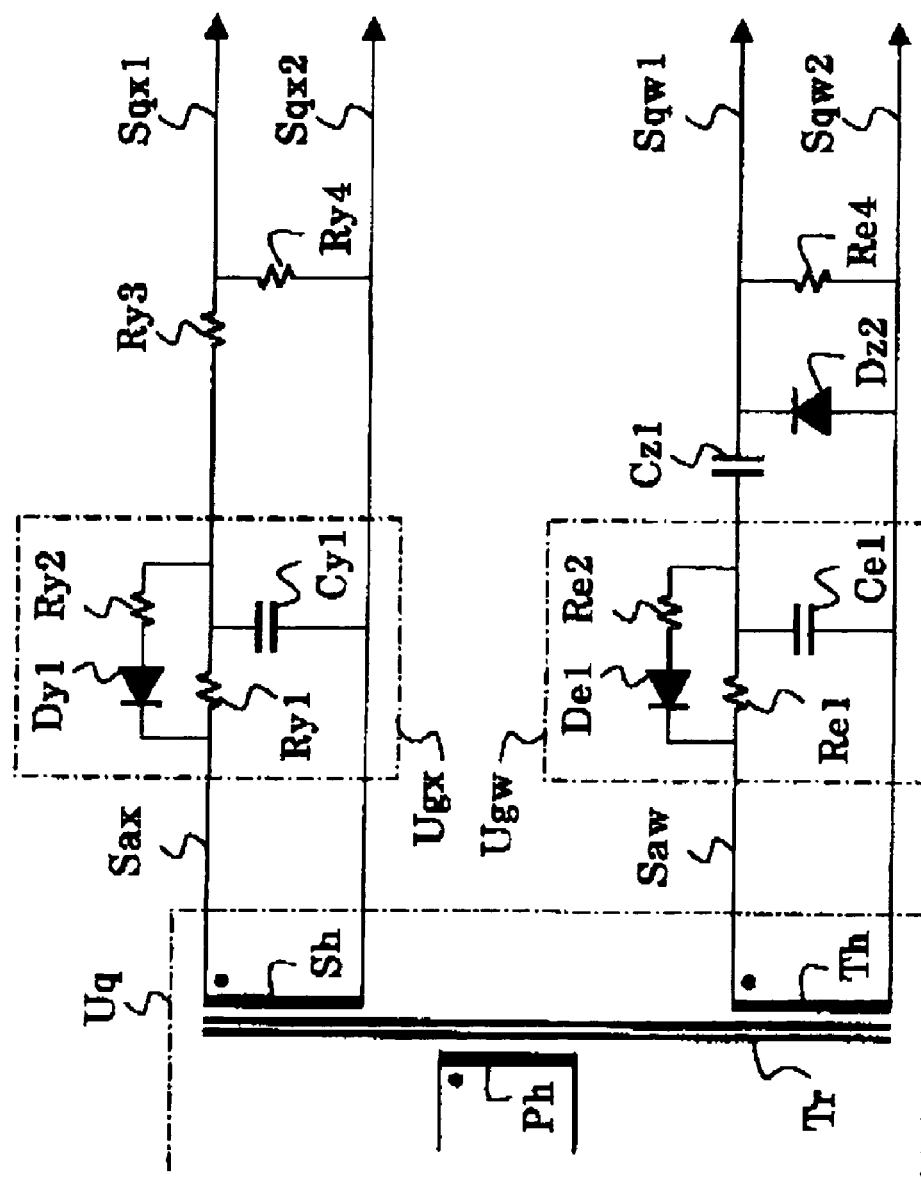
FIG. 11 shows a schematic of an embodiment of the circuit arrangement of the driver control element of a DC—DC converter of the invention.

FIG. 11 shows an example of the case in which to implement driving of this auxiliary switching device (Qw) the parts beginning with the secondary winding (Th) are changed in the driver control element (Gw) which is described above using FIG. 9. Here specifically, the polarity of the secondary winding (Th) is made in-phase with the secondary winding (Sh) and there is in addition a differential circuit which includes a capacitor (Cz1) and a diode (Dz2).

Figure 12:
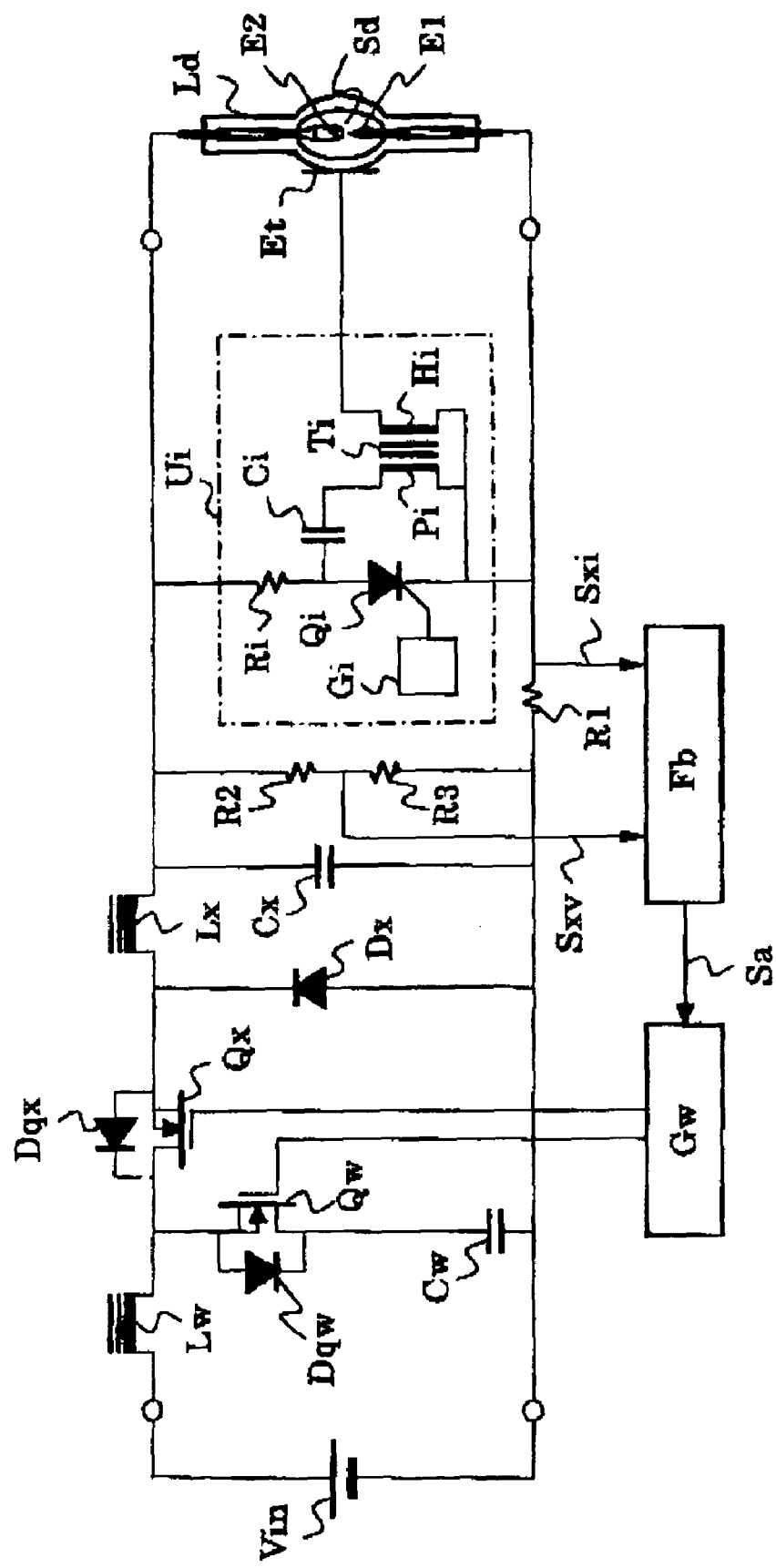
FIG. 12 shows a schematic of an embodiment of the invention described in the second aspect.

FIG. 12 shows an embodiment of the invention according to its second aspect. This embodiment is a device for operating a high pressure discharge lamp using a starter which is called an external trigger type. In the high pressure discharge lamp (Ld), there is an auxiliary electrode (Et) besides the electrodes for the main discharge such that it does not come into contact with the discharge space (Sd). Between this auxiliary electrode (Et) and the first and second electrodes a high voltage is applied, by which plasmas are produced in the discharge space (Sd). The main discharge is started by a voltage (no-load voltage) which is applied beforehand between the first electrode and the second electrode, these plasmas acting as the initiating substance.

Figure 13:
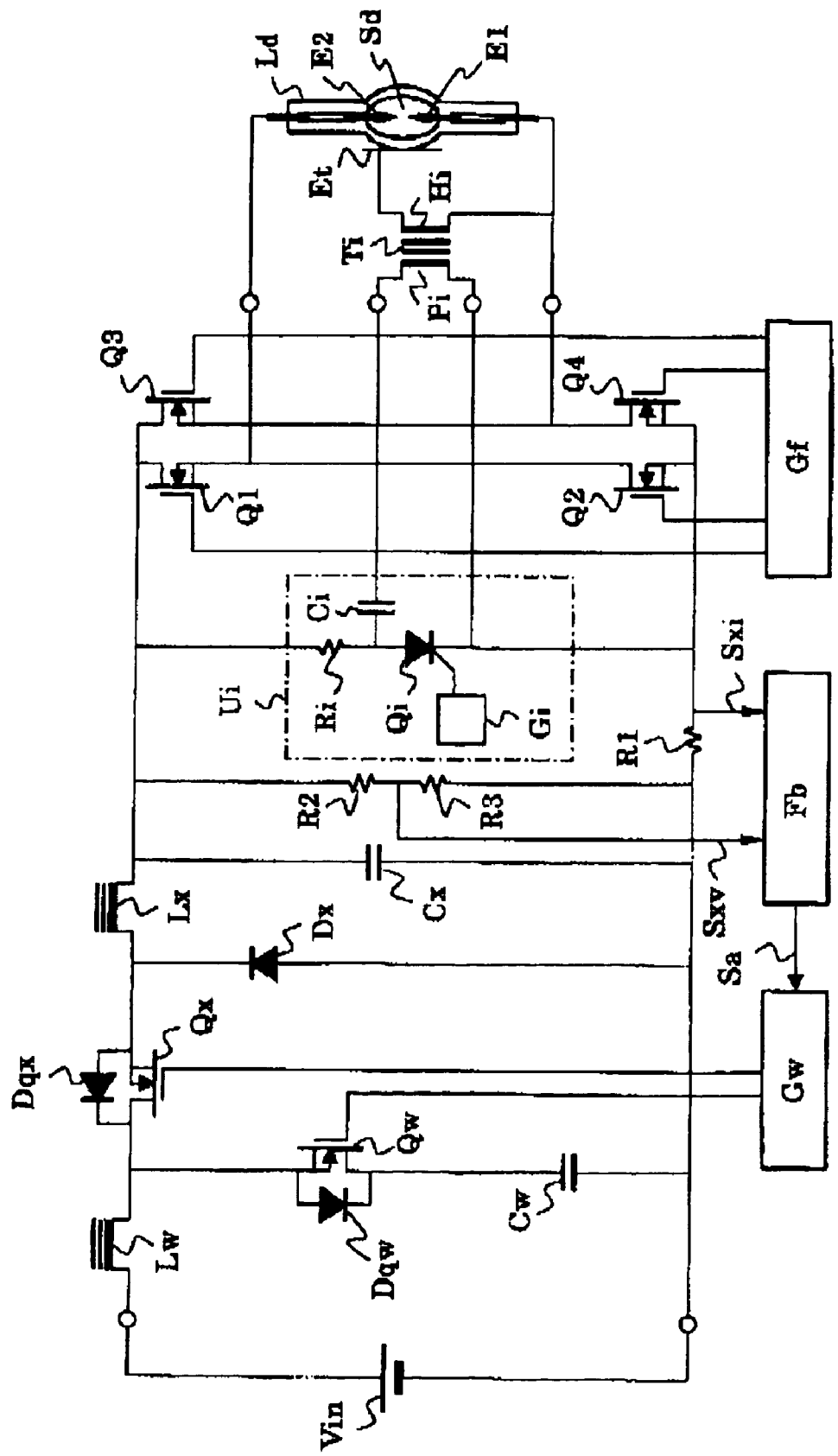
FIG. 13 shows a schematic of an embodiment of the invention described in the second aspect.

FIG. 13 shows an embodiment of the invention in its second aspect. Here, a device for operating a high pressure discharge lamp of the external trigger type is shown in which an AC voltage is applied to the high pressure discharge lamp (Ld).

It became possible to apply an alternating discharge voltage to the high pressure discharge lamp (Ld) by installing a full bridge inverter by adding switching devices to the direct current output part of the DC—DC converter. The added switching devices are driven by a control circuit part (Gf) for full bridge driving and are controlled in such a way that the diagonal elements are driven in alternation so that the switching devices (Q1, Q4) (Q2, Q3) are closed at the same time as the diagonal elements of the full bridge inverter.

In these application documents, only what is most necessary in the circuit arrangement is described in order to explain the operation, function and action of the light source device of the invention. Therefore, it is assumed that the other details of circuit operation which is described in the embodiments, for example, the polarity of the signals, the specific choice, the specification addition and omission of circuit components or concepts such as changes and the like are intensively carried out for reasons of facilitating the procurement of components and for economic reasons, in the practice of building an actual device.

It is assumed that especially a device for protecting the circuit components of a feed device, such as switching devices, for example, a FET or the like, against damage factors such as a wattage which exceeds a certain value, a current which exceeds a certain value, overheating and the like, or a device which reduces formation of radiation noise and line noise which arise according to operation of the circuit components of the feed device, or which prevents the noise formed from being released to the outside, such as a snubber circuit, a varistor, a clamping diode (including the "pulse-by-pulse method"), a current limiter circuit, a noise filter reactor coil with a "common mode" or a "normal mode", a noise filter capacitor and the like, if necessary is added to the respective part of the circuit arrangements which are described in the embodiments.

Action of the Invention

The invention in its first aspect can provide a low cost DC—DC converter which eliminates the disadvantage of a conventional DC—DC converter, i.e. the disadvantage of difficult implementation of reducing the switching loss in a wide, variable range of the continuity ratio of the main switching device.

The invention in its second aspect can provide a low cost device for operating a high pressure discharge lamp which eliminates the disadvantage of a conventional device for operating a high pressure discharge lamp, i.e., the disadvantage of the difficult implementation of reducing the switching loss.

What we claim is:

1. A DC—DC converter of the voltage reduction-buck type comprising:
    a direct current source (Vin);
    an ON-OFF-controllable main switching device (Qx);
    a main coil (Lx) which is series connected to the main switching device (Qx);
    a fly-wheel diode (Dx) arranged such that the induction current of the main coil (Lx) flows when the main switching device (Qx) is shifted into the OFF state;
    a smoothing capacitor (Cx) for smoothing the output of the main coil (Lx);
    an auxiliary coil (Lw);
    a resonant capacitor (Cw); and
    an ON-OFF-controllable auxiliary switching device (Qw),
    wherein the auxiliary switching device (Qw) and the resonant capacitor (Cw) are series-connected to form a series connection, the series connection, the auxiliary coil (Lw) and the DC source (Vin) being connected in series to form a closed loop,
    wherein the series connection, the main switching device (Qx) and the fly-wheel diode (Dx) are series connected and form a closed loop, and
    wherein the main switching device (Qx) and the auxiliary switching device (Qw) are controlled such that they are alternatively shifted into the ON state and the main switching device (Qw) is shifted into the ON state within a given time after the auxiliary switching device (Qw) has been shifted into the OFF state.

2. A device for operating a high pressure discharge lamp (Ld) which includes a discharge space (Sd) filled with a discharge medium and a pair of opposed electrodes (E1, E2) within the discharge space for establishing a main discharge, comprising the DC—DC converter of claim 1.

* * * * *